United States Patent

Mori

(10) Patent No.: US 9,573,624 B2
(45) Date of Patent: Feb. 21, 2017

(54) PARKING ASSIST APPARATUS

(71) Applicant: Mitsubishi Electric Corporation, Tokyo (JP)

(72) Inventor: Masanori Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/827,740

(22) Filed: Aug. 17, 2015

(65) Prior Publication Data

US 2016/0280263 A1    Sep. 29, 2016

(30) Foreign Application Priority Data

Mar. 23, 2015 (JP) ................................ 2015-059322

(51) Int. Cl.
*B62D 15/02* (2006.01)
*G01S 15/93* (2006.01)

(52) U.S. Cl.
CPC ........... *B62D 15/027* (2013.01); *G01S 15/931* (2013.01); *G01S 2015/932* (2013.01)

(58) Field of Classification Search
CPC ...... B62D 15/028; G08G 1/165; G08G 1/168; B60R 1/00
USPC ..................... 701/302, 1, 25; 340/932.2, 435
See application file for complete search history.

(56) References Cited

U.S. PATENT DOCUMENTS

2010/0019935 A1*  1/2010  Kawabata ................. B60R 1/00
                                                    340/932.2
2014/0244070 A1*  8/2014  Inagaki ............. B62D 15/0285
                                                       701/1

FOREIGN PATENT DOCUMENTS

| JP | 2013-220745 A | 10/2013 |
| JP | 5506803 B2 | 5/2014 |
| JP | 2014156201 A | 8/2014 |
| WO | 2014057621 A1 | 4/2014 |

OTHER PUBLICATIONS

Communication dated Apr. 5, 2016, issued by the Japan Patent Office in corresponding Japanese Application No. 2015-059322.

* cited by examiner

*Primary Examiner* — Marthe Marc-Coleman
(74) *Attorney, Agent, or Firm* — Sughrue Mion, PLLC; Richard C. Turner

(57) ABSTRACT

Provided is a parking assist apparatus capable of appropriately guiding a self-vehicle into a parking space even when accuracy of estimation of a corner position of each object located at a position adjacent to the parking space is low. Parking-space information, which is estimated by detecting the corner position of each of the objects sandwiching the parking space while the parking space is being searched, is sequentially corrected by using a reflection-point position on each of objects, which is detected while the self-vehicle is being guided into the parking space. Guiding assistance processing to the parking space is performed by using the corrected parking-space information.

5 Claims, 14 Drawing Sheets

APPROXIMATE DIRECTED LINE SEGMENT

PARKED VEHICLE

PARKING ASSIST APPARATUS

BACKGROUND OF THE INVENTION

1. Field of the Invention

The present invention relates to a parking assist apparatus configured to estimate a reflection-point position on an object, at which a detection wave emitted from a distance sensor mounted in a self-vehicle is reflected, to thereby estimate parking-space information of the self-vehicle so as to provide parking assistance based on the result of estimation.

2. Description of the Related Art

Hitherto, there has been proposed a parking assist apparatus configured to provide appropriate parking assistance to a driver who attempts to park a self-vehicle in a parking space between two parked vehicles (for example, see Japanese Patent No. 5506803 and Japanese Patent Application Laid-open No. 2013-220745).

In the related art disclosed in Japanese Patent No. 5506803, distance data corresponding to a corner portion of each of the parked vehicles is extracted from a time series of distance data from the self-vehicle to each of the parked vehicles, which is measured by using distance sensors mounted in the self-vehicle. The extracted distance data is subjected to noise-component removal and data interpolation using curve approximation as data processing.

Subsequently, a reflection-point position on each of the parked vehicles is estimated from the distance data that is subjected to the data processing and sensor-position data indicating a movement locus of a sensor position of the distance sensor. Further, a width of the parking space is estimated based on a corner position of each of the parked vehicles, which is obtained from the estimated reflection-point positions, thereby determining whether or not the self-vehicle can be parked in the parking space.

In the related art disclosed in Japanese Patent Application Laid-open No. 2013-220745, after the corner position of each of the parked vehicles is detected from the distance data from the self-vehicle to each of the parked vehicles, which is measured by using the distance sensors mounted in the self-vehicle, and the sensor-position data indicating the movement locus of each of the distance sensors, a supposed side-surface range is set.

Subsequently, the supposed side-surface range is divided into a near-side supposed side-surface range and a far-side supposed side-surface range. The corner positions are corrected by using the reflection-point positions present in the near-side supposed side-surface range, while the reflection-point positions present in the far-side supposed side-surface range are linearly approximated. In this manner, the side surfaces of the parked vehicles are estimated.

However, the related art has the following problems.

According to the related art disclosed in Japanese Patent No. 5506803, the corner positions of the parked vehicles are estimated while the self-vehicle is moving past a side of the parking space so as to determine whether or not the self-vehicle can be parked in the parking space. When it is determined that the self-vehicle can be parked in the parking space, the self-vehicle is guided into the parking space.

In this case, the parking space is estimated as, for example, a rectangle having a line segment connecting the corner positions as one side and a self-vehicle width in a case of parallel parking and a self-vehicle length in a case of perpendicular parking as a length of another side. In general, however, a vehicle width of the parked vehicle, a vehicle length of the parked vehicle, and a parking direction such as an inclination of the parked vehicle differ for each of the parked vehicles. Further, a shape of the estimated parking space is different from that of an actual parking space.

Therefore, there is a problem in that the self-vehicle cannot be appropriately guided into the parking space between the parked vehicles merely by estimating the corner positions of the parked vehicles as in the related art disclosed in Japanese Patent No. 5506803.

According to the related art disclosed in Japanese Patent Application Laid-open No. 2013-220745, the reflection-point position on each of the parked vehicles is estimated even when the self-vehicle is guided into the parking space, while the supposed side-surface ranges are set so as to correct the parking space that is estimated based only on the corner positions.

In this case, the supposed side-surface range is set as a rectangle having certain width and depth in a direction orthogonal to a straight line that is obtained by connecting the corner positions of the parked vehicles, which are estimated while the self-vehicle moves past the side of the parking space.

However, accuracy of estimation of the corner positions depends on a model of the parked vehicle. For example, the accuracy of estimation of the corner positions for a parked vehicle having an angular shape differs from that for a parked vehicle having a round shape. Further, a model of an actually parked vehicle cannot be known.

Therefore, the related art disclosed in Japanese Patent Application Laid-open No. 2013-220745 has the following problem. Specifically, when the accuracy of estimation of the corner positions is low, the side surfaces of the actually parked vehicles are not contained in the supposed side-surface ranges. Thus, the self-vehicle cannot be appropriately guided into the parking space between the parked vehicles.

SUMMARY OF THE INVENTION

The present invention has been made to solve the problems described above, and therefore has an object to provide a parking assist apparatus capable of appropriately guiding a self-vehicle into a parking space even when accuracy of estimation of a corner position of each object located at a position adjacent to the parking space is low.

According to one embodiment of the present invention, there is provided a parking assist apparatus for performing, while moving a self-vehicle including: a distance sensor for detecting distance data to an object corresponding to a target to be detected by radiating a detection wave to the object to obtain a detection wave reflected at a reflection-point position on the object, which corresponds to a shortest distance to the object; and a vehicle information sensor for detecting, as self-vehicle data, a state relating to a velocity and a traveling direction of the self-vehicle, processing of estimating a parking space in which parking of the self-vehicle is possible when an operation mode is a search mode and performing guiding assistance processing for enabling the self-vehicle to be parked in the parking space when the operation mode is a guide mode based on results of time-series detections performed by the distance sensor and the vehicle information sensor, the parking assist apparatus including: a reflection-point positioning unit for estimating the reflection-point positions on the object in time series from the results of the time-series detections performed by the distance sensor and the vehicle information sensor; a corner detecting unit for estimating a corner position of the object as corner-position information by using the reflection-point positions estimated in time series by the reflection-point positioning unit; a parking-space estimating unit for estimating the parking space in which the parking of the self-vehicle is possible as parking-space information by using the corner-position information estimated by the corner detecting unit; and a vehicle control unit for providing parking assistance for enabling the self-vehicle to be parked in the parking space in accordance with the parking-space information estimated by the parking-space estimating unit, in which: the parking-space estimating unit is configured to, when the operation mode is the guide mode: extract at least a part of the reflection-point positions estimated in time series by the reflection-point positioning unit, to thereby accumulate the extracted reflection-point positions as a reflection-point group; and specify the accumulated reflection-point positions included in the reflection-point group as one of a reflection-point position derived from a side surface of the object, a reflection-point position derived from a front surface of the object, and a reflection-point position derived from both the side surface and the front surface of the object, to thereby correct the parking-space information in accordance with a result of the specification; and the vehicle control unit provides the parking assistance in accordance with the corrected parking-space information.

According to the one embodiment of the present invention, the parking-space information is estimated by detecting the corner position of each of the objects sandwiching the parking space while the parking space is being searched. The reflection-point position on each of objects, which is detected while the self-vehicle is being guided into the parking space, is specified as the reflection-point position derived from the side surface of the object, the reflection-point position derived from the front surface of the object, or the reflection-point position derived from both the side surface and the front surface of the object. The parking-space information is sequentially corrected in accordance with the result of specification. Guiding assistance processing to the parking space is performed by using the corrected parking-space information. In this manner, the parking assist apparatus capable of appropriately guiding the self-vehicle into the parking space even if the accuracy of estimation of the corner position of each of the objects present at the positions adjacent to the parking space is low can be provided.

DETAILED DESCRIPTION OF THE PREFERRED EMBODIMENTS

Now, parking assist apparatus according to exemplary embodiments of the present invention are described referring to the accompanying drawings. In the illustration of the drawings, the same or corresponding components are denoted by the same reference symbols, and the overlapping description thereof is herein omitted.

First Embodiment

Figure 1:
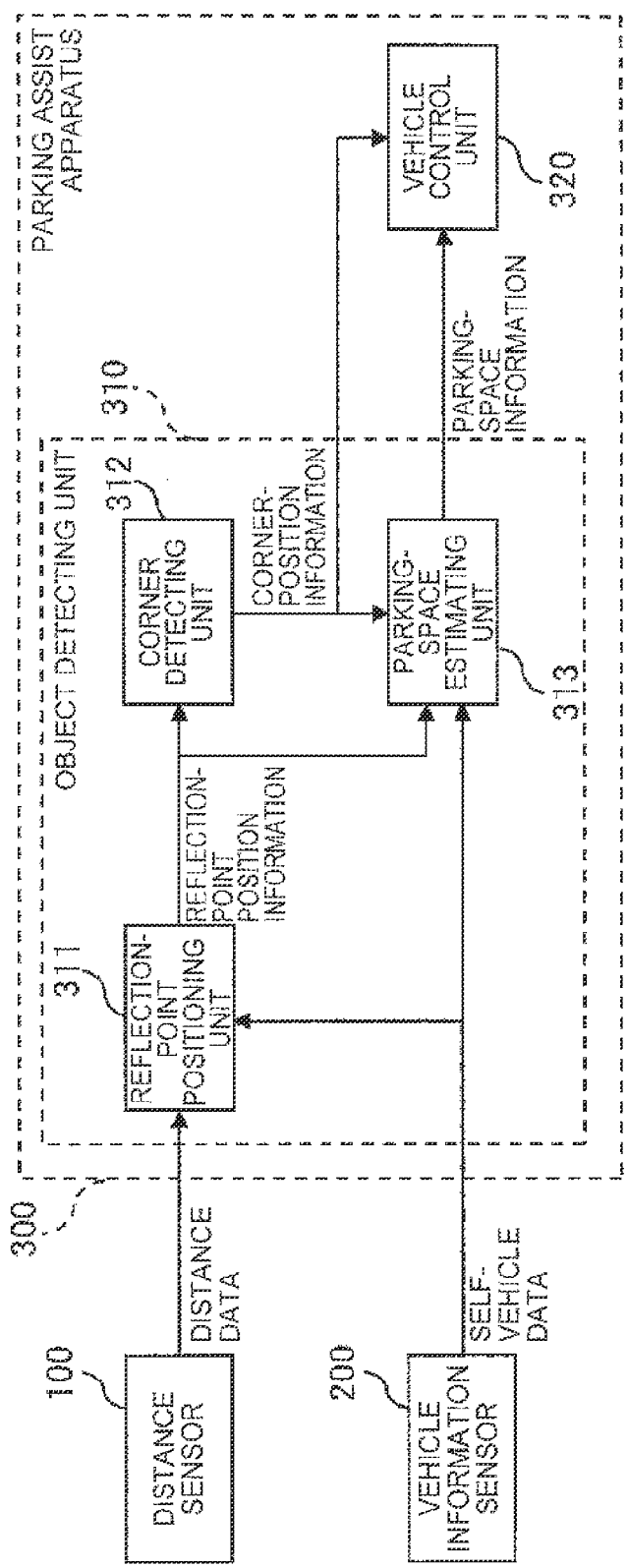
FIG. 1 is a block diagram for illustrating a configuration of a parking assist system including a parking assist apparatus according to a first embodiment of the present invention.

FIG. 1 is a block diagram for illustrating a configuration of a parking assist system including a parking assist apparatus 300 according to a first embodiment of the present invention.

The parking assist system illustrated in FIG. 1 includes a distance sensor 100, a vehicle information sensor 200, and the parking assist apparatus 300. Although a plurality of distance sensors 100 are practically mounted in a self-vehicle, in the first embodiment, the single distance sensor 100 is described, assuming that processing performed by each of the plurality of distance sensors 100 is the same.

The distance sensor 100 irradiates an object that is a target to be detected with a detection wave so as to obtain the detection wave reflected at a reflection-point position on the object, which corresponds to the shortest distance to the object. In this manner, distance data to the object is detected. Specifically, the distance sensor 100 radiates an ultrasonic wave to the object that is the target to be detected, receives an ultrasonic wave reflected from the object, and performs signal processing based on a time difference between the radiated ultrasonic wave and the received ultrasonic wave to detect a distance to the object as the distance data.

The distance sensor 100 outputs the detected distance data to the parking assistance apparatus 300. Further, the distance data detected by the distance sensor 100 is stored in a memory unit (not shown) in association with time at which the distance data is detected.

Here, it is assumed that a position at which the distance sensor 100 is mounted in the self-vehicle and sensor orientation information of the distance sensor 100 are known. The sensor orientation information contains a sight-line direction of the distance sensor 100 and a viewing angle of the distance sensor 100. The sight-line direction of the distance sensor 100 corresponds to an orientation in which the distance sensor 100 is mounted. The viewing angle of the distance sensor 100 corresponds to an orientation width detectable by the distance sensor 100. The position at which the distance sensor 100 is mounted in the self-vehicle and the sensor orientation information of the distance sensor 100 are collectively referred to as "known sensor information".

A type of sensor that detects the distance to the object as the distance data by performing signal processing or image processing using a detection wave such as light or an electromagnetic wave in place of the ultrasonic wave may be used as the distance sensor 100. Specifically, a millimeter-wave radar, a laser radar, an ultrasonic-wave sensor, an infrared sensor, or an optical camera can be used as the distance sensor 100.

Further, as the object that is a target to be detected by the distance sensor 100, a parked vehicle is given, for example. As a specific example, it is supposed in the first embodiment that the object that is a target to be detected by the distance sensor 100 is a parked vehicle.

Figure 5:
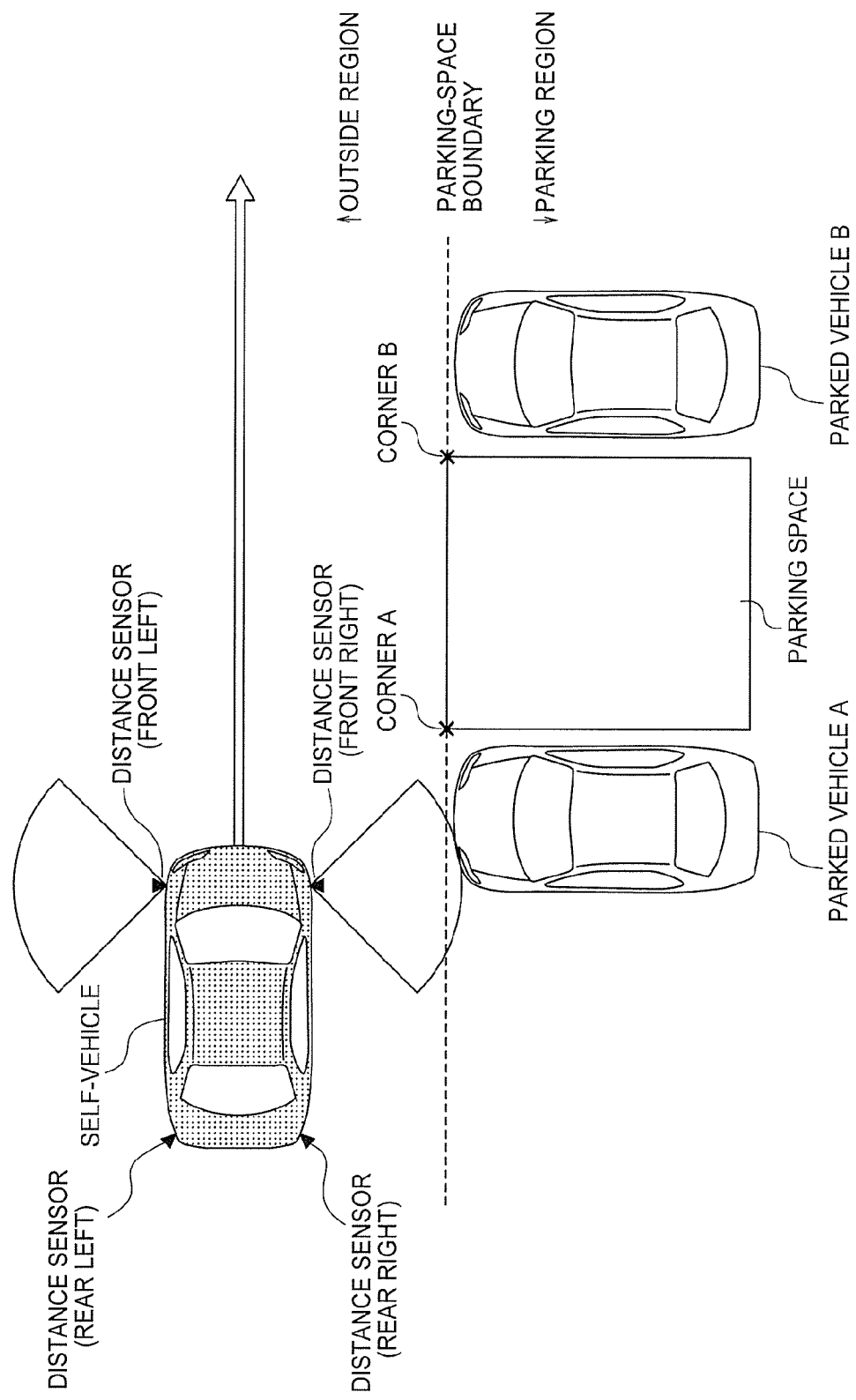
FIG. 5 is an explanatory diagram for illustrating a positional relationship between a self-vehicle and parked vehicles for perpendicular parking when an operation mode of the parking assist apparatus is a search mode according to the first embodiment of the present invention.
Figure 6:
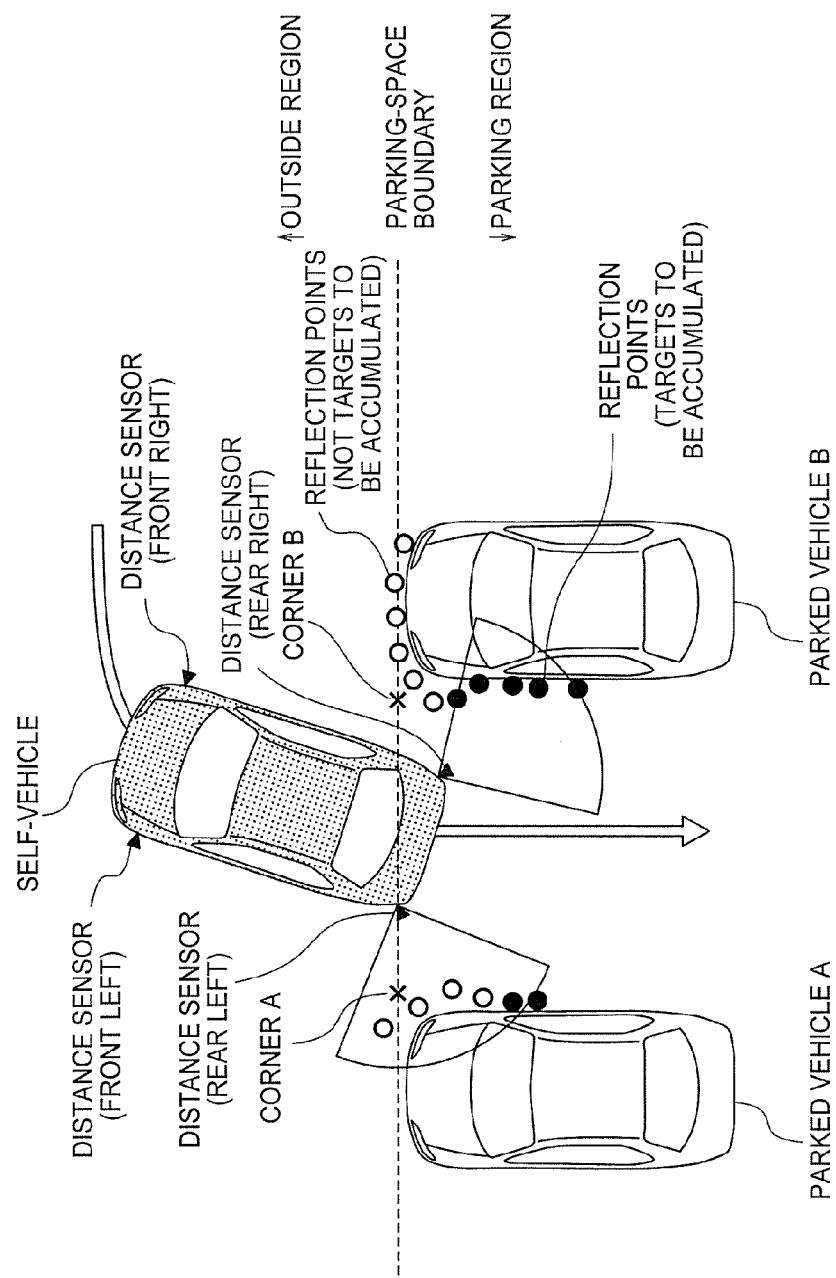
FIG. 6 is an explanatory diagram for illustrating the positional relationship between the self-vehicle and the parked vehicles for the perpendicular parking when the operation mode of the parking assist apparatus is a guide mode according to the first embodiment of the present invention.

Further, the position at which the distance sensor 100 is mounted can be set arbitrarily. However, it is preferred to mount the distance sensors, for example, on the front left, the front right, the rear left, and the rear right of the self-vehicle as the distance sensors 100, as illustrated in FIG. 5 and FIG. 6 referred to later.

The vehicle information sensor 200 is mounted in the vehicle and detects a state relating to a velocity and a traveling direction of the self-vehicle as self-vehicle data. Specifically, the vehicle information sensor 200 detects a state relating to the velocity and the traveling direction of the self-vehicle such as a velocity, a wheel velocity, a steering angle, and a yaw rate of the self-vehicle as the self-vehicle data.

The vehicle information sensor 200 outputs the detected self-vehicle data to the parking assist apparatus 300. Further, the self-vehicle data detected by the vehicle information sensor 200 is stored in the memory unit in association with time at which the self-vehicle data is detected.

The vehicle information sensor 200 may also be configured so as to detect, as the self-vehicle data, latitude, longitude, and the traveling direction of the self-vehicle by using a global positioning system (GPS).

The parking assist apparatus 300 includes an object detecting unit 310 and a vehicle control unit 320. When an operation mode is a search mode, the parking assist apparatus 300 performs processing of estimating a parking space in which the self-vehicle can be parked. Specifically, when the operation mode is the search mode, the parking assist apparatus 300 estimates parking-space information as the processing of estimating the parking space.

Further, when the estimation of the parking-space information is completed in the search mode, the parking assist apparatus 300 switches the operation mode from the search mode to a guide mode to perform guiding assistance processing for enabling the self-vehicle to park in the parking space. Specifically, when the operation mode is the guide mode, the parking assist apparatus 300 provides parking assistance while sequentially correcting the parking-space information that is estimated in the search mode as the guiding assistance processing.

Specifically, when a driver who drives the self-vehicle attempts to park the self-vehicle in the parking space, the parking assist apparatus 300 is activated. After the activation, the parking assist apparatus 300 switches the operation mode to the search mode. In this case, the parking assist apparatus 300 estimates the parking-space information.

Subsequently, when the estimation of the parking-space information is completed in the search mode, the parking assist apparatus 300 switches the operation mode from the search mode to the guide mode. In this case, the parking assist apparatus 300 provides parking assistance while sequentially correcting the parking-space information that is estimated in the search mode.

When the operation mode is the search mode, the object detecting unit 310 estimates the parking-space information while the self-vehicle is moving past aside of or in front of the objects present at positions adjacent to the parking space.

Specifically, when the operation mode is the search mode, the object detecting unit 310 obtains time-series detection results by the distance sensor 100 and the vehicle information sensor 200 to estimate the reflection-point position on the object, which changes in time series, from the detection results. In this manner, a position of a corner portion of each of the objects is estimated as corner-position information.

Subsequently, the object detecting unit 310 estimates the parking-space information from the estimated corner-position information.

Further, when the operation mode is the guide mode, the object detecting unit 310 obtains the time-series detection results by the distance sensor 100 and the vehicle information sensor 200 to estimate the reflection-point position on the object, which changes in time series, from the detection results. In this manner, the parking-space information that is estimated in the search mode is sequentially corrected.

The object detecting unit 310 includes a reflection-point positioning unit 311, a corner detecting unit 312, and a parking-space estimating unit 313.

The reflection-point positioning unit 311 uses a time series of the distance data input from the distance sensor 100 and a time series of self-vehicle data input from the vehicle information sensor 200 to estimate the reflection-point position on the object. Further, the reflection-point positioning unit 311 outputs the estimated reflection-point position to the corner detecting unit 312 and the parking-space estimating unit 313 as reflection-point position information.

As a specific method of estimating the reflection-point position on the object by the reflection-point positioning unit 311, for example, an estimation method using two-circle intersection processing or an estimation method using two-circle tangent processing can be used.

Figure 2:
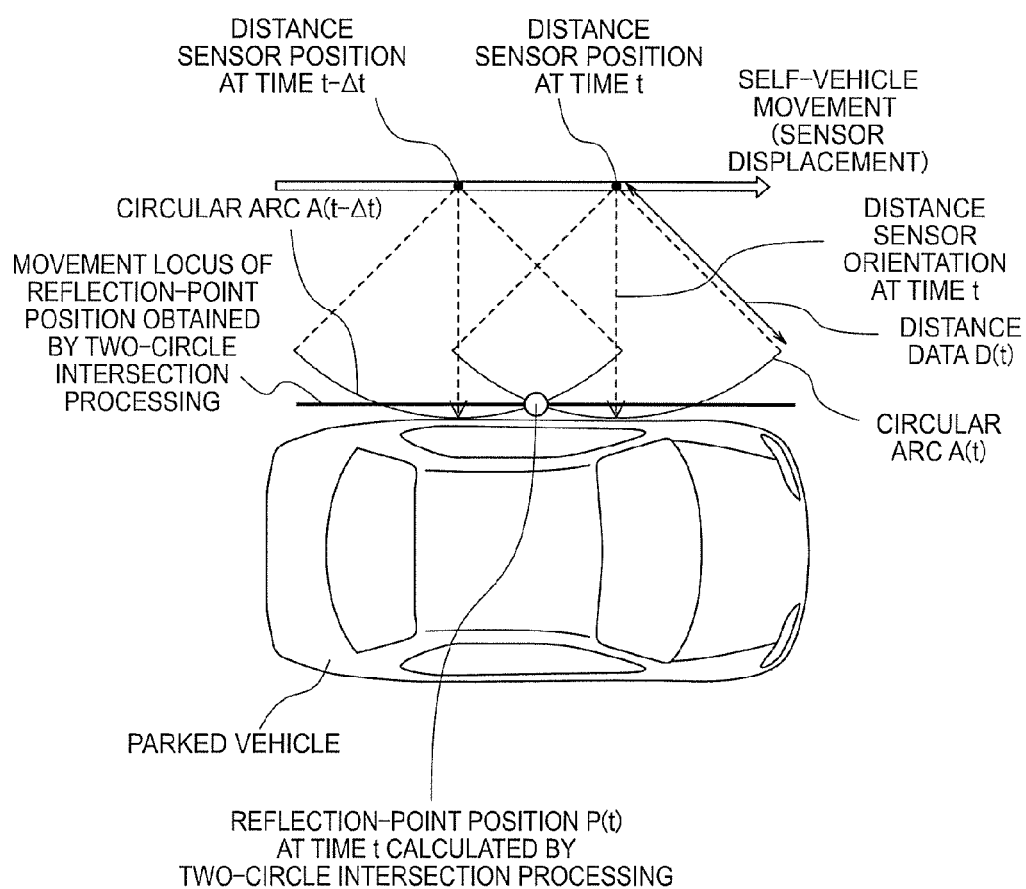
FIG. 2 is an explanatory diagram for illustrating a method of estimating a reflection-point position by two-circle intersection processing according to the first embodiment of the present invention.
Figure 3:
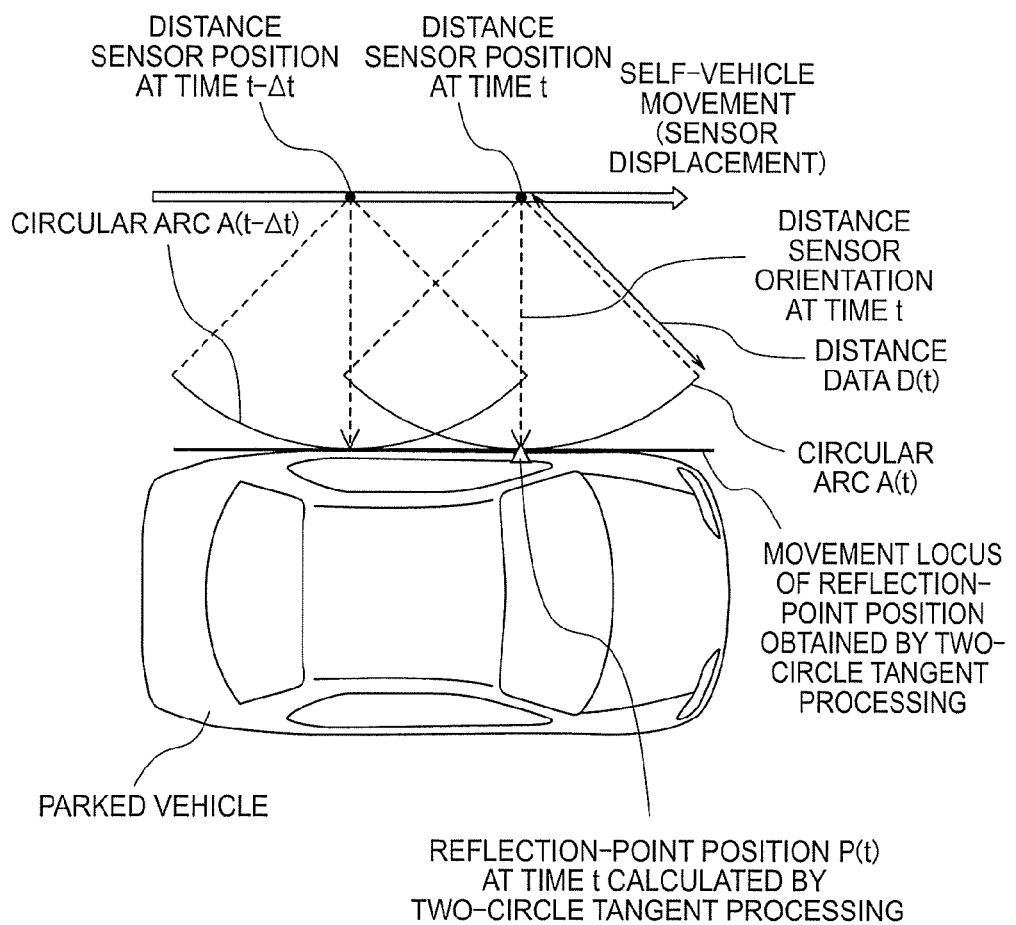
FIG. 3 is an explanatory diagram for illustrating a method of estimating a reflection-point position by two-circle tangent processing according to the first embodiment of the present invention.

Here, each of the estimation method using two-circle intersection processing and the estimation method using two-circle tangent processing, which are examples of the method of estimating the reflection-point position on the object, is described referring to FIG. 2 and FIG. 3. FIG. 2 is an explanatory diagram for illustrating the method of estimating the reflection-point position by using the two-circle intersection processing according to the first embodiment of the present invention. FIG. 3 is an explanatory diagram for illustrating the method of estimating the reflection-point position by using the two-circle tangent processing according to the first embodiment of the present invention. FIG. 2 and FIG. 3 are exemplary illustrations of a case where a side surface portion of the parked vehicle is detected by the distance sensor 100.

As illustrated in FIG. 2 and FIG. 3, a case where a distance-sensor position, which is a position of the distance sensor 100, is displaced in a direction indicated by the arrow with movement of the self-vehicle relative to the parked vehicle is considered. The reflection-position positioning unit 311 is configured to estimate the distance-sensor position from the self-vehicle data input from the vehicle information sensor 200 and the known sensor information.

In this case, at a current time t, a reflection-point position P(t) on the parked vehicle is present at some point on a circle having the distance-sensor position as a center and distance data D(t) detected by the distance sensor 100 at the time t as a radius. On the circle described above, a range in which the reflection-point position P(t) is present can be represented by a circular arc A(t) from the orientation range defined by the sensor orientation and the sensor viewing angle contained in the known sensor information of the distance sensor 100. Specifically, the reflection-point position P(t) is present at some point on the circular arc A(t).

Similarly to the time t, even for a time t−Δt earlier than the time t, a range in which the reflection-point position P(t−Δt) on the parked vehicle is present can be represented by a circular arc A(t−Δt).

Here, as illustrated in FIG. 2, it is assumed that the reflection-point position on the parked vehicle at the time t and that at the time t−Δt are approximately the same in the two-circle intersection processing.

Therefore, based on the assumption described above, an intersection between the circular arc A(t) representing the range in which the reflection-point position P(t) is present at the time t and the circular arc A(t−Δt) representing the range in which the reflection-point position P(t−Δt) is present at the time t−Δt is defined as the reflection-point position P(t) at the time t in the two-circle intersection processing. In the related art, the reflection-point position on the object at the time t is generally estimated only by the two-circle intersection processing as described above in this application. The related art described above is disclosed in Japanese Patent No. 5506803 and Japanese Patent Application Laid-open No. 2013-220745.

On the other hand, in the two-circle tangent processing, attention is paid to a practical change in reflection-point position between the time t−Δt and the time t with the change in distance-sensor position between the time t−Δt and the time t, as illustrated in FIG. 3. Therefore, in contrast to the two-circle intersection processing, it is not supposed that the reflection-point position on the parked vehicle at the time t and that at the time t−Δt are approximately the same in the two-circle tangent processing. Further, the reflection-point position on the parked vehicle at each of the times is a shortest-distance point, at which a distance from the distance sensor 100 to the object becomes the shortest, and moves with the movement of the distance sensor 100.

Therefore, in the two-circle tangent processing, a common tangent to the circular arc A(t) representing the range in which the reflection-point position P(t) is present at the time t and the circular arc A(t−Δt) representing the range in which the reflection-point position P(t−Δt) is present at the time t−Δt is drawn. A point of tangency on the circular arc A(t), which is in contact with the common tangent, is defined as the reflection-point position P(t) at the time t.

As described above, the two methods respectively using the two-circle intersection processing and the two-circle tangent processing are described as the examples of the method of estimating the reflection-point position on the object by using the distance data detected by the distance sensor 100 referring to FIG. 2 and FIG. 3.

Referring back to FIG. 1, when the operation mode is the search mode, the corner detecting unit 312 estimates the corner position of the object as the corner-position information from the time-series of the reflection-point position input as the reflection-point position information from the reflection-point positioning unit 311. Further, the corner detecting unit 312 outputs the estimated corner-position information to the parking-space estimating unit 313.

A known method only needs to be used as a method of estimating the corner position of the object by using the reflection-point position information, which is performed by the corner detecting unit 312. For example, methods disclosed in Japanese Patent No. 5506803 and Japanese Patent Application Laid-open No. 2013-220745 only need to be used.

When the operation mode is the search mode, the parking-space estimating unit 313 estimates the parking-space information from the corner-position information input from the corner detecting unit 312 and outputs the estimated parking-space information to the vehicle control unit 320.

When the operation mode is the guide mode, the parking-space estimating unit 313 corrects the parking-space information estimated in the search mode from new reflection-point position information for each of the objects, which is input from the reflection-point positioning unit 311, and outputs the corrected parking-space information to the vehicle control unit 320.

When the operation mode is switched from the search mode to the guide mode, the vehicle control unit 320 uses the parking-space information estimated in the search mode to calculate a traveling path for the movement of the self-vehicle to the parking space. Specifically, the vehicle control unit 320 calculates the traveling path from a positional relationship between a position of the parking space, which is contained in the parking-space information estimated in the search mode, and a current position of the self-vehicle.

The vehicle control unit 320 provides parking assistance so that the self-vehicle moves into the parking space in accordance with the initially calculated traveling path. Further, the vehicle control unit 320 calculates a new traveling path by using the parking-space information corrected by the parking-space estimating unit 313 while the self-vehicle is moving in accordance with the initially calculated traveling path. The vehicle control unit 320 continues the parking assistance in accordance with the new calculated traveling path. In a case where the parking-space information is not corrected by the parking-space estimating unit 313, the vehicle control unit 320 provides the parking assistance in accordance with the current parking-space information.

As a specific example of the parking assistance provided by the vehicle control unit 320, the vehicle control unit 320 can be configured to control the self-vehicle so that the driver does not need to perform a steering operation on the presumption that an accelerator operation, a brake operation, and a gearshift operation are performed by the driver himself/herself. Further, the vehicle control unit 320 can also be configured to control the self-vehicle so that the driver does not need to perform not only the steering operation but also at least one of the accelerator operation, the brake operation, or the gearshift operation.

Figure 4:
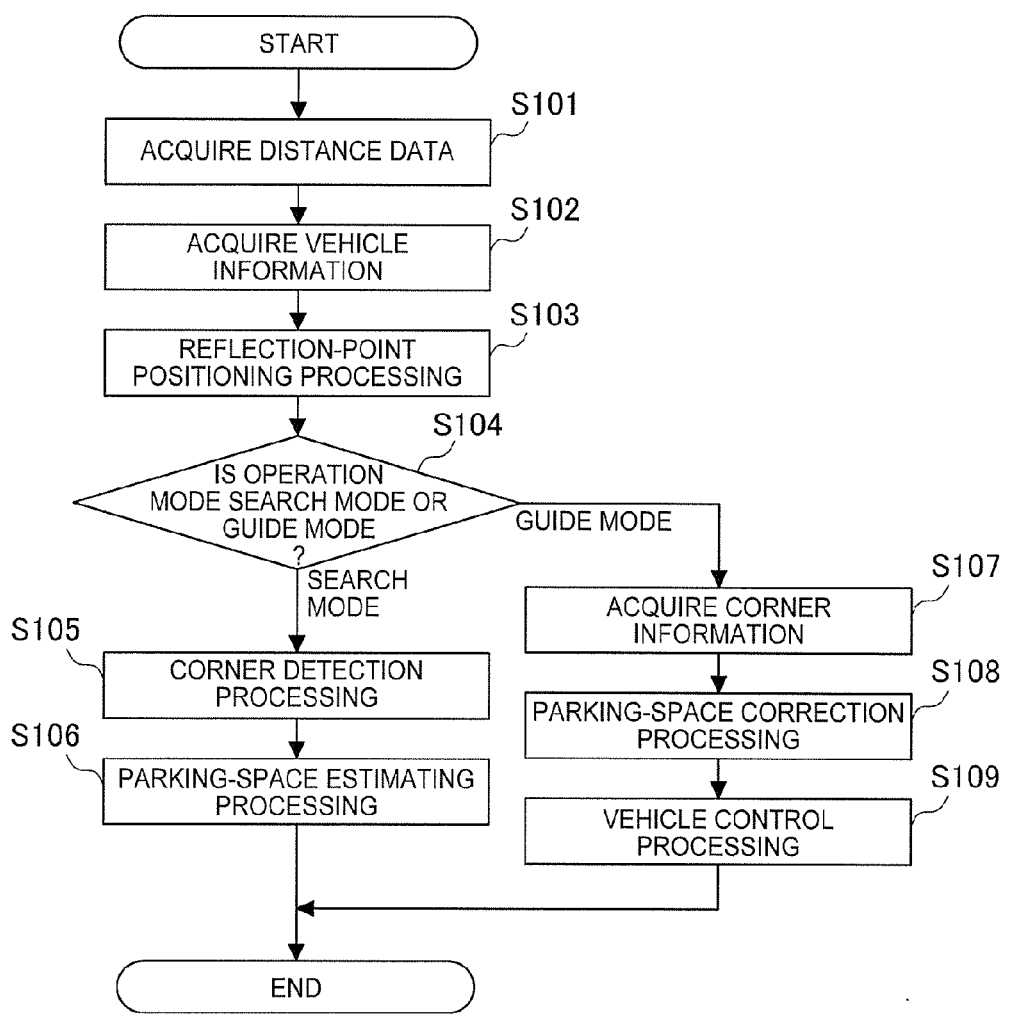
FIG. 4 is a flowchart for illustrating an operation series performed by the parking assist apparatus according to the first embodiment of the present invention.

Next, an example of an operation of the parking assistance apparatus 300 is described referring to FIG. 4, FIG. 5, and FIG. 6. FIG. 4 is a flowchart for illustrating an operation series performed by the parking assist apparatus 300 according to the first embodiment of the present invention. FIG. 5 is an explanatory diagram for illustrating a positional relationship between the self-vehicle and the parked vehicles for perpendicular parking when the operation mode of the parking assist apparatus 300 is the search mode according to the first embodiment of the present invention. FIG. 6 is an explanatory diagram for illustrating the positional relationship between the self-vehicle and the parked vehicles for the perpendicular parking when the operation mode of the parking assistance apparatus 300 is the guide mode according to the first embodiment of the present invention.

It is assumed that the operation series of the flowchart of FIG. 4 is executed for each preset period.

First, in Step S101, the distance sensor 100 acquires the distance data from the self-vehicle to each of the parked vehicles located around the self-vehicle and outputs the acquired distance data to the reflection-point positioning unit 311. Then, the processing proceeds to Step S102.

In Step S102, the vehicle information sensor 200 acquires the self-vehicle data and outputs the acquired self-vehicle data to the reflection-point positioning unit 311 and the parking-space estimating unit 313. Then, the processing proceeds to Step S103.

In Step S103, the reflection-point positioning unit 311 uses the time series of the distance data input from the distance sensor 100 and the time series of the self-vehicle data input from the vehicle information sensor 200 to estimate the reflection-point position on the parked vehicle. Then, the processing proceeds to Step S104.

In Step S104, the parking assist apparatus 300 determines whether the operation mode is the search mode or the guide mode. When the operation mode is the search mode, the processing proceeds to Step S105. On the other hand, when the operation mode is the guide mode, the processing proceeds to Step S107.

When the operation mode is the search mode, the parking assist apparatus 300 is in a phase in which the self-vehicle is moving past the parking space to search the parking space.

Specifically, for example, as illustrated in FIG. 5, the self-vehicle moves in front of a parked vehicle A and a parked vehicle B, which are present at positions adjacent to the parking space, in a direction indicated by the arrow. In this manner, the parking assist apparatus 300 estimates the parking-space information.

Further, when the processing of estimating the parking space while estimating the corner portion of each of the parked vehicles is completed, the self-vehicle is stopped by manual switching by the driver or automatic switching by the parking assist apparatus 300. Then, the operation mode of the parking assist apparatus 300 is switched from the search mode to the guide mode.

On the other hand, when the operation mode is the guide mode, the parking assist apparatus 300 is in a phase in which the parking assist apparatus 300 is guiding the self-vehicle into the parking space after estimating the parking space and determining that the self-vehicle can park in the parking space.

Specifically, as illustrated in FIG. 6, for example, the parking assist apparatus 300 provides the parking assistance while sequentially correcting the parking-space information estimated in the search mode.

In Step S105, the corner detecting unit 312 estimates a corner position of each of the parked vehicles from the time series of the reflection-point positions on the object, which is estimated by the reflection-point positioning unit 311. Then, the processing proceeds to Step S106.

Specifically, as illustrated in FIG. 5, for example, the self-vehicle moves in front of the parked vehicle A and the parked vehicle B present at the positions adjacent to the parking space in the direction indicated by the arrow. By the movement described above, the reflection-point positioning unit 311 uses the time series of the distance data input from any one of the front-right distance sensor and the front-left distance sensor, which are mounted as the distance sensors 100, to estimate the reflection-point positions on the parked vehicle A and the parked vehicle B as reflection-point position information. Further, the corner detecting unit 312 uses the reflection-point position information of each of the parked vehicle A and the parked vehicle B to estimate the corner position of the parked vehicle A as a corner A and the corner position of the parked vehicle B as a corner B.

In Step S106, the parking-space estimating unit 313 estimates the parking-space information from the corner positions estimated by the corner detecting unit 312. Then, the processing is terminated.

Specifically, for example, as illustrated in FIG. 5, the parking-space estimating unit 313 estimates, as a parking space, a rectangle that has a line segment connecting the corner A and the corner B as a length of one side and a self-vehicle length as a length of another side. In a case of parallel parking in place of the perpendicular parking illustrated in FIG. 5, a rectangle that has the line segment connecting the corner positions as the length of one side and a self-vehicle width as the length of another side only needs to be estimated as the parking space.

In Step S107, the parking-space estimating unit 313 acquires the corner-position information of each of the parked vehicles, which is estimated by the corner detecting unit 312 in the guide mode. Then, the processing proceeds to Step S108.

In Step S108, the parking-space estimating unit 313 performs parking-space correction processing for correcting the parking-space information based on the corner-position information of each of the parked vehicles, which is estimated by the corner detecting unit 312, and the time series of the reflection-point positions on each of the parked vehicles, which is estimated by the reflection-point positioning unit 311. Then, the processing proceeds to Step S109.

Specifically, as illustrated in FIG. 6, for example, while the parking assistance is being provided by the vehicle control unit 320 so that the self-vehicle moves in the direction indicated by the arrow after the operation mode is switched to the guide mode, the reflection-point positioning unit 311 estimates the reflection-point position on each of the parked vehicle A and the parked vehicle B. Specifically, the reflection-point positioning unit 311 uses the time series of the distance data input from the rear-right distance sensor and the rear-left distance sensor, which are mounted as the distance sensors 100, to estimate the reflection-point positions on the parked vehicle A and the reflection-point positions on the parked vehicle B as the reflection-point position information. Further, the parking-space estimating unit 313 uses the time series of the reflection-point positions on each of the parked vehicle A and the parked vehicle B, which are estimated by the reflection-point positioning unit 311, and the corner A and the corner B, which are estimated by the corner detecting unit 312 in the search mode, to estimate vehicle side-surface information including a side-surface shape and a side-surface position of each of the parked vehicles and correct the parking-space information based on the estimated vehicle side-surface information.

In Step S109, the vehicle control unit 320 uses the parking-space information corrected by the parking-space estimating unit 313 to provide the parking assistance. Then, the processing is terminated.

Figure 7:
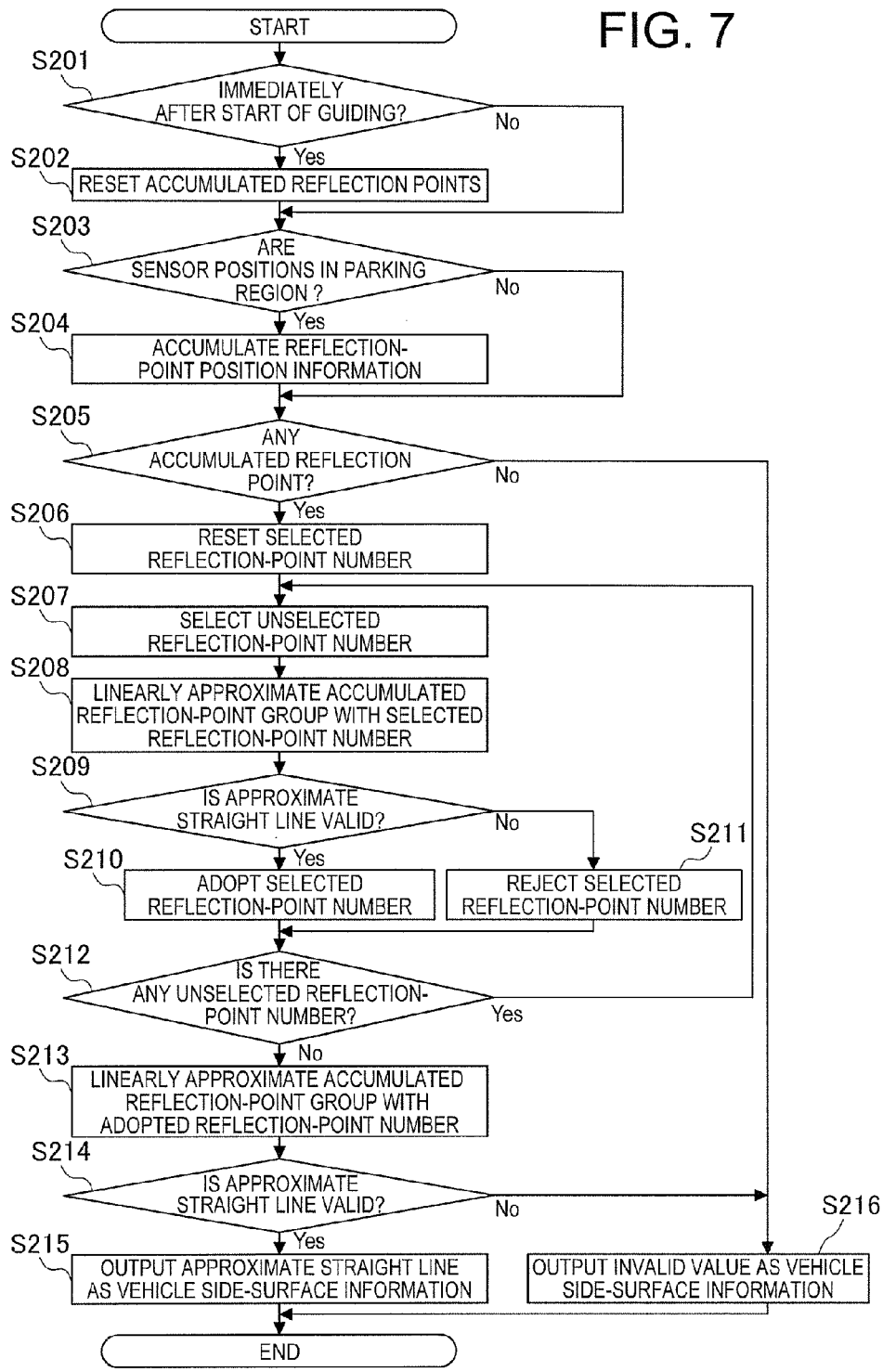
FIG. 7 is a flowchart for illustrating parking-space correction processing performed by a parking-space estimating unit according to the first embodiment of the present invention.

Next, details of the parking-space correction processing performed by the parking-space estimating unit 313 are described referring to FIG. 7. FIG. 7 is a flowchart for illustrating the parking-space correction processing performed by the parking-space estimating unit 313 according to the first embodiment of the present invention. The parking-space correction processing corresponds to processing in Step S108 of the flowchart of FIG. 4.

First, in Step S201, the parking-space estimating unit 313 determines whether or not the operation mode is switched to the guide mode for the first time.

When the operation mode is the search mode in this step, the processing proceeds from Step S104 to Step S105 in FIG. 4 without performing the processing in Step S108. Therefore, the processing in Step S201 is equivalent to determination of whether or not the processing in Step S108 is performed for the first time after the operation mode is switched to the guide mode.

In Step S201, when the operation mode is switched to the guide mode for the first time, the processing performed by the parking-space estimating unit 313 proceeds to Step S202. If not, the processing proceeds to Step S203.

In Step S202, the parking-space estimating unit 313 initializes accumulated reflection-point information. Then, the processing proceeds to Step S203.

In Step S203, the parking-space estimating unit 313 determines whether or not current sensor positions are in the parking region based on the self-vehicle data input from the vehicle information sensor 200 and the corner position of each of the parked vehicles, which is input from the corner detecting unit 312. The corner position of each of the parked vehicles, which is input from the corner detecting unit 312, is the corner-position information of each of the parked vehicles, which is acquired in Step S107 of FIG. 4.

Specifically, as illustrated in FIG. 6, for example, when the current sensor positions of the rear-left distance sensor and the rear-right distance sensor, which are mounted as the distance sensors 100, exceed a parking-space boundary, the parking-space estimating unit 313 determines that the current sensor positions are in the parking region. On the other hand, while the operation mode is the guide mode as illustrated in FIG. 5, the current sensor positions are always in an outside region. In FIG. 5 and FIG. 6, a straight line that connects the corner A and the corner B is referred to as the "parking-space boundary". A region including the parking space, which is defined by the parking-space boundary, is referred to as "parking region", whereas a region located on the side of the parking-space boundary, which is opposite to the "parking region", is referred to as "outside region".

Figure 8:
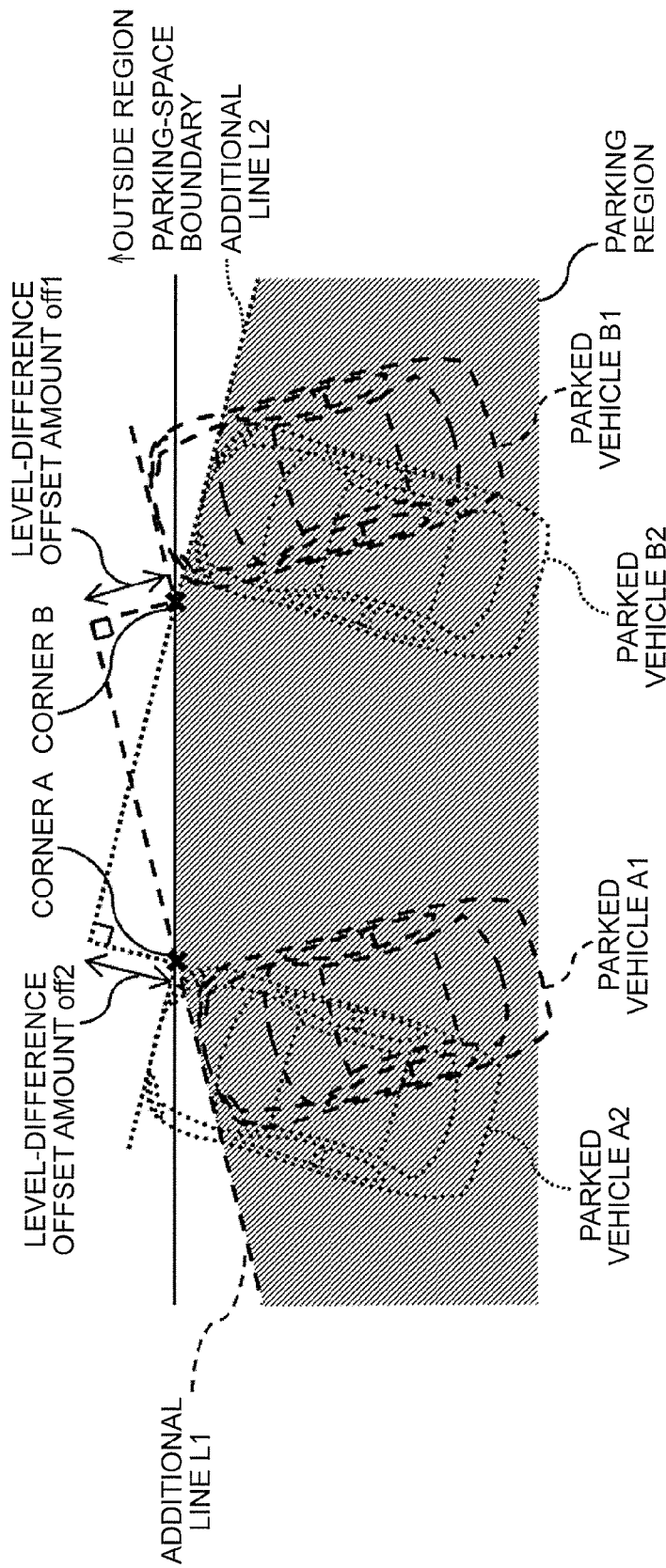
FIG. 8 is an explanatory diagram for illustrating another example of a parking region defined according to the first embodiment of the present invention.

Further, here, the region including the parking space, which is defined by the parking-space boundary, is defined as the "parking region". However, the "parking region" may also be defined in consideration of a possibility that two vehicles may be parked at an angle with respect to the parking-space boundary without being aligned horizontally. FIG. 8 is an explanatory diagram for illustrating another example of the parking region that is defined in the first embodiment of the present invention.

As illustrated in FIG. 8, in an actual case, front surfaces of the two parked vehicles are not necessarily aligned on the same straight line and there is a possibility in that the two vehicles are parked at an angle with respect to the parking-space boundary without being aligned horizontally. Specifically, as exemplified in FIG. 8, there is a possibility in that the two parked vehicles have a positional relationship between a parked vehicle A1 and a parked vehicle B1 or a positional relationship between a parked vehicle A2 and a parked vehicle B2. In this case, a straight line connecting the corner A and the corner B estimated in the search mode does not indicate a precise parking-space boundary. Therefore, in consideration of the possibility of the two vehicles parked at an angle without being aligned on the same line, the parking region is defined.

Specifically, as illustrated in FIG. 8, an additional line L1, which perpendicularly crosses a line segment starting at the corner B and having a preset level-difference offset amount off1 as a length and passes through the corner A, is defined. Similarly, an additional line L2, which perpendicularly crosses a line segment starting at the corner A and having a preset level-difference offset amount off2 as a length and passes through the corner B, is defined. A region obtained by overlapping a region inside the additional line L1, a region inside the additional line L2, and a region inside the parking-space boundary is defined as the parking region. As described above, as another example of the parking region, a hatched region illustrated in FIG. 8 may be defined as the parking region by using the preset level-difference offset amounts for the corner positions of the parked vehicles.

When the parking-space estimating unit 313 determines that the current sensor positions are in the parking region, the processing proceeds to Step S204. If not, the processing proceeds to Step S205.

In Step S204, the parking-space estimating unit 313 accumulates the reflection points on each of the parked vehicles, which are estimated by the reflection-point positioning unit 311 in samplings, with a number that identifies each of the parked vehicles. Then, the processing proceeds to Step S205. The number that identifies each of the parked vehicles is denoted as "reflection-point number".

Here, the processing in Step S204 is performed only when it is determined in Step S203 that the current sensor positions are in the parking region.

Further, as illustrated in FIG. 6, the reflection points present in front of or on a front part of each of the parked vehicles are estimated while the sensor positions are in the outside region. Therefore, the reflection points present in front of or on the front part of each of the parked vehicles are not targets to be accumulated.

On the other hand, as illustrated in FIG. 6, the reflection points present on the sides of the parked vehicles are estimated while the sensor positions are in the parking region. Therefore, when the sensor positions are in the parking region, the estimated reflection points are targets to be accumulated as the reflection points on the side surfaces of the parked vehicles.

The reflection-point number is provided so that at least each of the parked vehicles can be identified. Specifically, the reflection-point number is provided so as to distinguish the parked vehicle A and the parked vehicle B illustrated in FIG. 5 and FIG. 6 from each other. Further, the traveling direction of the self-vehicle may be read from a gearshift position of the self-vehicle so that the reflection-point number is changed in accordance with the traveling direction of the self-vehicle.

In Step S205, the parking-space estimating unit 313 determines whether or not the reflection-point information is accumulated therein. When the reflection-point information is accumulated therein, the processing performed by the parking-space estimating unit 313 proceeds to Step S206. If not, the processing proceeds to Step S216.

In Step S206, the parking-space estimating unit 313 resets all the reflection points having the selected reflection-point number corresponding to the currently accumulated reflection-point information. Then, the processing proceeds to Step S207.

In Step S207, the parking-space estimating unit 313 selects one reflection-point number that is not selected yet from the reflection-point numbers corresponding to the currently accumulated reflection-point information. Then, the processing proceeds to Step S208.

In Step S208, the parking-space estimating unit 313 obtains an approximate straight line from a reflection-point group corresponding to the reflection-point number selected in Step S207 in the currently accumulated reflection-point information. Then, the processing proceeds to Step S209.

Here, the approximate straight line only needs to be obtained by linearly approximating the reflection-point group by using, for example, a least square method as an approximation method. Further, if a self-vehicle velocity is low, the reflection points included in the reflection-point group concentrate to a certain position to prevent the reflection-point group to be linearly approximated in some cases. In this case, for example, the approximate straight line only needs to be obtained in the following manner. A plane is divided in a lattice pattern. A center of gravity is obtained by a reflection-point group present in the same lattice to define one representative reflection point representing the reflection-point group. Then, the representative reflection points are linearly approximated to obtain the approximate straight line.

In Step S209, the parking-space estimating unit 313 determines whether or not the approximate straight line obtained in Step S208 is valid.

Figure 9:
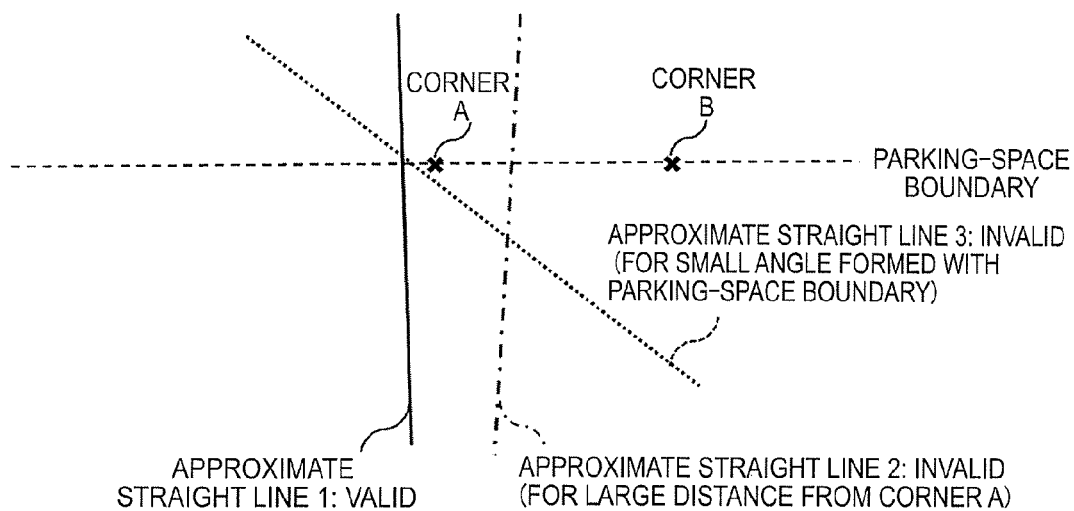
FIG. 9 is an explanatory diagram for illustrating an example of determination of validity of an approximate straight line, which is performed by the parking-space estimating unit according to the first embodiment of the present invention.

Here, determination of validity of the approximate straight line, which is performed by the parking-space estimating unit 313 in Step S209, is described referring to FIG. 9. FIG. 9 is an explanatory diagram for illustrating an example of the determination of validity of the approximate straight line, which is performed by the parking-space estimating unit 313, according to the first embodiment of the present invention.

The reflection-point group corresponding to the reflection-point number selected in Step S207 is expected to be the reflection points derived from the side surface of any of the parked vehicle A and the parked vehicle B, as illustrated in FIG. 6. Therefore, the approximate straight line obtained from the reflection-point group corresponding to the reflection-point number selected in Step S207 is expected to represent the side surface of any of the parked vehicle A and the parked vehicle B.

However, there is a possibility that accuracy of estimation of the reflection-point position included in the reflection-point group corresponding to the reflection-point number selected in Step S207 is low due to the effects of the sensor positions of the distance sensors 100 or an error in the distance data detected by the distance sensors 100. In such a case, there is a possibility that accuracy of estimation of the approximate straight line obtained in Step S208 is also low.

Thus, as illustrated in FIG. 9, for example, when a distance between the corresponding corner A or corner B and the approximate straight line is smaller than a preset distance value and an angle formed between the parking-space boundary and the approximate straight line is larger than a preset angle value, the parking-space estimating unit 313 determines that the approximate straight line is valid. If not, the parking-space estimating unit 313 determines that the approximate straight line is invalid. The preset distance value and the preset angle value are set in advance.

As a specific example, three approximate straight lines 1, 2, and 3 are considered. The approximate straight lines 1, 2, and 3 are all obtained by linearly approximating the reflection-point groups, each regarded as being composed of the reflection points on the side surface of the parked vehicle A.

For example, when the approximate straight line 1 is obtained as the approximate straight line, a distance between the approximate straight line 1 and the corner A of the parked vehicle A corresponding to the approximate straight line 1 is smaller than the preset distance value. Further, an angle formed between the parking-space boundary and the approximate straight line 1 is larger than the preset angle value. In this case, the parking-space estimating unit 313 determines that the approximate straight line 1 is valid.

Further, for example, when the approximate straight line 2 is obtained as the approximate straight line, a distance between the approximate straight line 2 and the corner A of the parked vehicle A corresponding to the approximate straight line 2 is larger than the preset distance value. In this case, the parking-space estimating unit 313 determines that the approximate straight line 2 is invalid.

Further, for example, when the approximate straight line 3 is obtained as the approximate straight line, an angle formed between the parking-space boundary and the approximate straight line 3 is smaller than the preset angle value. In this case, the parking-space estimating unit 313 determines that the approximate straight line 3 is invalid.

Referring back to FIG. 7, when the parking-space estimating unit 313 determines that the approximate straight line obtained in Step S208 is valid in Step S209, the processing proceeds to Step S210. When the parking-space estimating unit 313 determines that the approximate straight line is invalid, the processing proceeds to Step S211.

In Step S210, the parking-space estimating unit 313 adopts the reflection-point group corresponding to the reflection-point number selected in Step S207. Then, the processing proceeds to Step S212.

In Step S211, the parking-space estimating unit 313 rejects the reflection-point group corresponding to the reflection-point number selected in Step S207. Then, the processing proceeds to Step S212.

In Step S212, the parking-space estimating unit 313 determines whether or not there is any reflection-point number that is not selected yet. When there is a reflection-point number that is not selected yet, the processing returns to Step S207 so that the parking-space estimating unit 313 performs the processing after Step S207 again. On the other hand, when there is no reflection-point number that is not selected yet, the processing performed by the parking-space estimating unit 313 proceeds to Step S213.

In Step S213, the parking-space estimating unit 313 obtains the approximate straight line from each of the reflection-point groups for all of the reflection-point groups adopted in Step S210. Then, the processing proceeds to Step S214.

Here, the approximate straight line only needs to be obtained by linearly approximating the reflection-point group by using, for example, a least square method as an approximation method. Further, if a self-vehicle velocity is low, the reflection points included in the reflection-point group concentrate to a certain position to prevent the reflection-point group to be linearly approximated in some cases. In this case, for example, the approximate straight line only needs to be obtained in the following manner. A plane is divided in a lattice pattern. A center of gravity is obtained by a reflection-point group present in the same lattice to define one representative reflection point representing the reflection-point group. Then, the representative reflection points are linearly approximated to obtain the approximate straight line.

In Step S214, the parking-space estimating unit 313 determines whether or not the approximate straight line obtained in Step S213 is valid.

Figure 10:
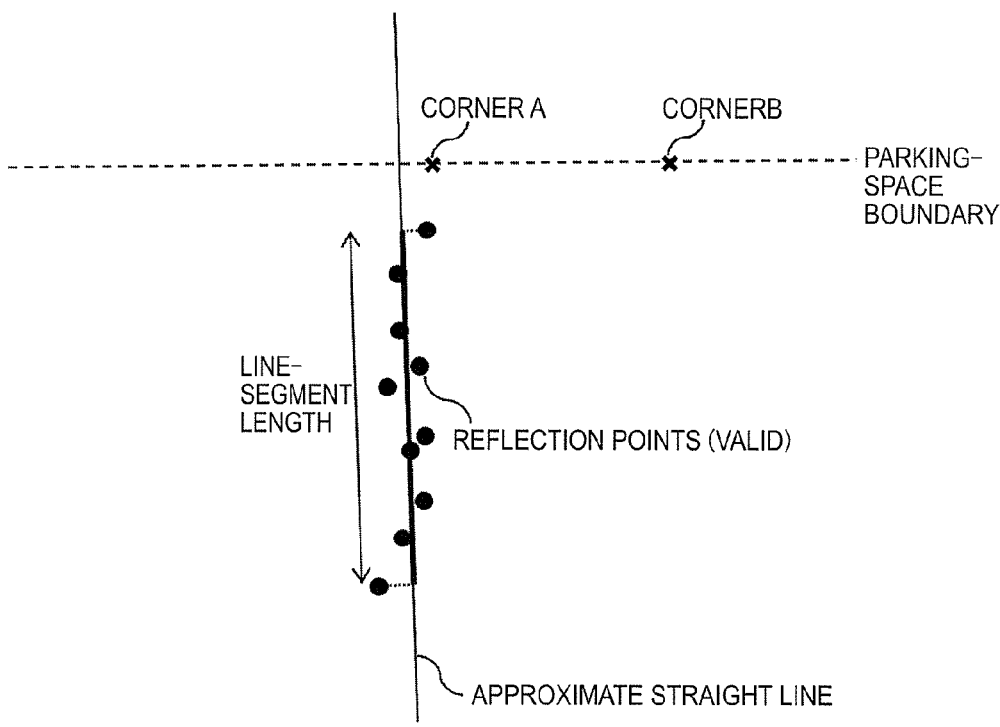
FIG. 10 is an explanatory diagram for illustrating another example of the determination of the validity of the approximate straight line, which is performed by the parking-space estimating unit according to the first embodiment of the present invention.

Here, determination of validity of the approximate straight line, which is performed by the parking-space estimating unit 313 in Step S214, is described referring to FIG. 9 and FIG. 10 as well. FIG. 10 is an explanatory diagram for illustrating another example of the determination of validity of the approximate straight line, which is performed by the parking-space estimating unit 313, according to the first embodiment of the present invention.

In Step S214, similarly to the above described referring to FIG. 9, when a distance between the corresponding corner A or corner B and the approximate straight line is smaller than a preset distance value and an angle formed between the parking-space boundary and the approximate straight line is larger than a preset angle value, the parking-space estimating unit 313 determines that the approximate straight line is valid. If not, the parking-space estimating unit 313 determines that the approximate straight line is invalid.

As another example of the determination of validity of the approximate straight line, which is performed by the parking-space estimating unit 313 in Step S214, the validity of the approximate straight line may be determined by a method illustrated in FIG. 10, for example.

Specifically, when the number of reflection points included in the reflection-point group adopted in Step S210 is small, there is a possibility that the accuracy of estimation of the approximate straight line is low. Therefore, the parking-space estimating unit 313 estimates a line-segment length of a portion that is detected as the side surface of the parked vehicle from the approximate straight line obtained in Step S213 and the reflection-point group corresponding to the approximate straight line. When the estimated line-segment length is longer than a preset line-segment value that is set in advance, it is determined that the approximate straight line is valid. If not, it is determined that the approximate straight line is invalid.

As a specific example, the parking-space estimating unit 313 selects the closest reflection point to the parking-space boundary and the farthest reflection point from the parking-space boundary from the positions of the reflection points included in the reflection-point group corresponding to the approximate straight line obtained in Step S213, as illustrated in FIG. 10. Further, the parking-space estimating unit 313 draws perpendiculars respectively from the two selected reflection points to the approximate straight line and obtains a distance between feet of the two perpendiculars as a line-segment length. When the line-segment length is long, it means that the number of reflection points included in the reflection-point group adopted in Step S210 is large. Therefore, when the line-segment length is longer than a preset line-segment length, the parking-space estimating unit 313 determines that the approximate straight line is valid.

The determination based on the distance between the approximate straight line and the corner and the determination based on the angle formed between the parking-space boundary and the approximate straight line, which are illustrated in FIG. 9, and the determination based on the line-segment length of the approximate straight line, which is illustrated in FIG. 10, may be combined arbitrarily. By appropriately combining the determination methods described above, the parking-space estimating unit 313 can determine the validity of the approximate straight line.

Referring back to FIG. 7, when the parking-space estimating unit 313 determines that the approximate straight line is valid in Step S214, the processing proceeds to Step S215. When the parking-space estimating unit 313 determines that the approximate straight line is invalid, the processing proceeds to Step S216.

In Step S215, the parking-space estimating unit 313 outputs the approximate straight line determined as valid in Step S214 as the vehicle side-surface information. Then, the processing is terminated. In this manner, the parking-space estimating unit 313 can correct the parking-space information by using the vehicle side-surface information. Specifically, the parking-space estimating unit 313 can obtain the side-surface shape and the side-surface position of the parked vehicle corresponding to the approximate straight line based on the approximate straight line determined as valid in Step S214. Therefore, the parking-space estimating unit 313 corrects the parking space based on the approximate straight line. The vehicle control unit 320 continues the parking assistance in accordance with the corrected parking space.

In Step S216, the parking-space estimating unit 313 outputs an invalid value as the vehicle side-surface information. Then, the processing is terminated. In this case, the parking-space estimating unit 313 does not correct the parking space.

In this manner, when the operation mode is the guide mode, the parking-space estimating unit 313 accumulates, as the reflection-point group, the positions of the reflection points estimated in time series by the reflection-point positioning unit 311 when the distance sensors 100 are present in the parking region and uses the accumulated reflection-point group to correct the parking-space information.

As described above, according to the first embodiment, when the operation mode is the guide mode, the parking-space estimating unit accumulates, as the reflection-point group, the positions of the reflection points estimated in time series by the reflection-point positioning unit when the distance sensors are present in the parking region and uses the accumulated reflection-point group to obtain the approximate straight line. Then, the parking-space estimating unit uses the obtained approximate straight line to correct the parking-space information.

In the manner described above, even when the accuracy of estimation of the corner position of each of the objects that are present at the positions adjacent to the parking space is low, the parking space is sequentially corrected during the guide mode. Therefore, the self-vehicle can be appropriately guided into the parking space.

Second Embodiment

In a second embodiment of the present invention, the parking assist apparatus 300 that is different from that of the first embodiment described above in the contents of the parking-space correction processing performed by the parking-space estimating unit 313 is described.

In the second embodiment, the description of the same parts as those of the first embodiment described above is omitted. Thus, differences in the operation of the parking-space correction processing performed by the parking-space estimating unit 313 from that of the first embodiment described above are mainly described.

Figure 11:
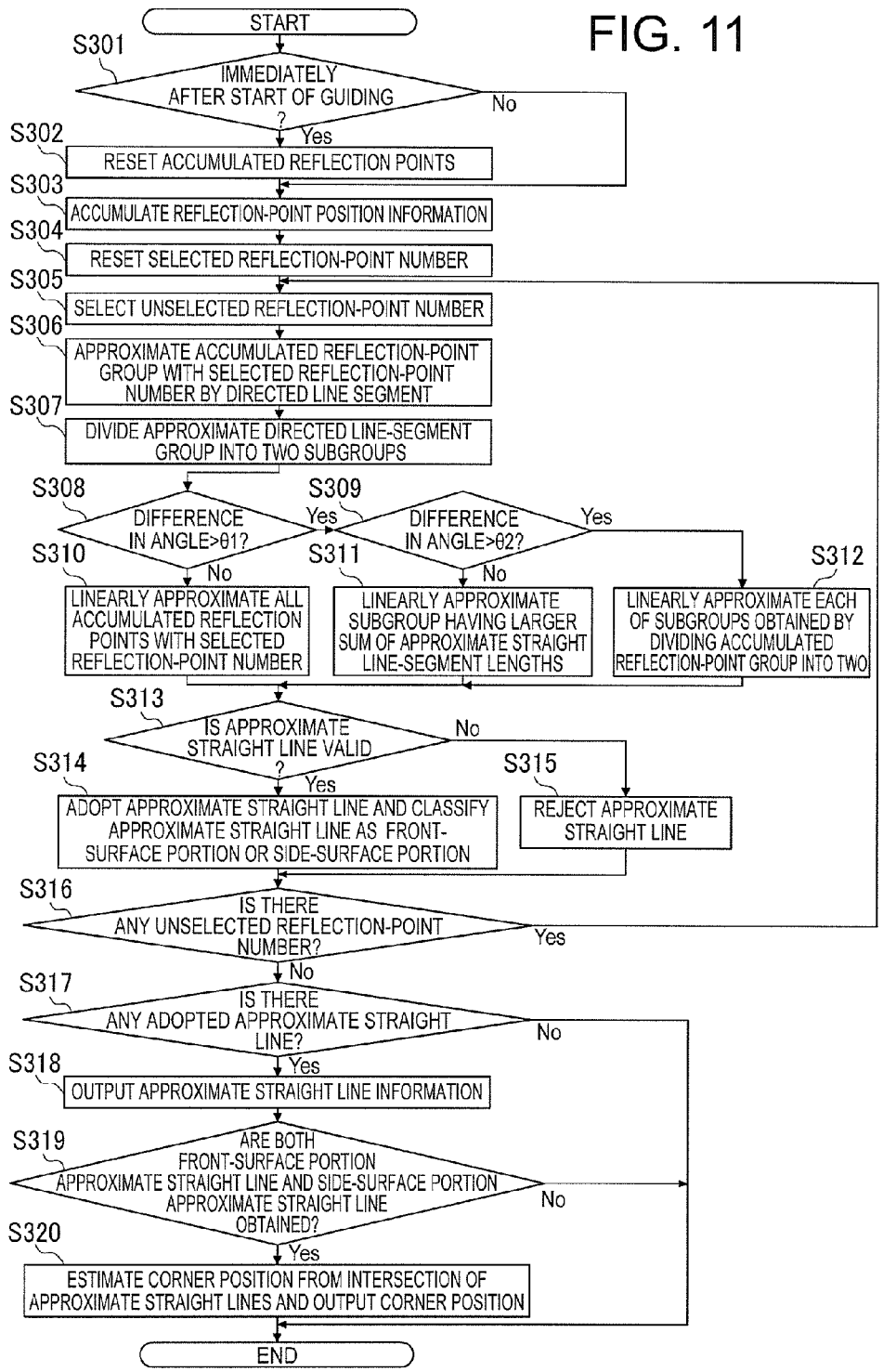
FIG. 11 is a flowchart for illustrating parking-space correction processing performed by a parking-space estimating unit according to a second embodiment of the present invention.

FIG. 11 is a flowchart for illustrating the parking-space correction processing performed by the parking-space estimating unit 313 according to the second embodiment of the present invention.

In the second embodiment, the parking-space estimating unit 313 is configured so as to accumulate the positions of the reflection points on the object, which are estimated by the reflection-point positioning unit 311, together with the reflection-point number regardless of whether or not the sensor positions of the distance sensors 100 are now in the parking region when the operation mode is the guide mode. Specifically, the positions of the reflection points estimated in time series by the reflection-point positioning unit after the operation mode is switched from the search mode to the guide mode are accumulated as the reflection-point group for each of the reflection-point numbers.

Therefore, in the flowchart of FIG. 11, steps corresponding to Step S203 and Step S205 of FIG. 7 according to the first embodiment described above are not provided.

As illustrated in FIG. 11, the parking-space estimating unit 313 executes Steps S301, S302, S303, S304, and S305 similar to Steps S201, S202, S204, S206, and S207 of FIG. 7 referred to above in this order. Then, the processing proceeds to Step S306.

In Step S306, the parking-space estimating unit 313 performs directed line-segment approximation of the reflection-point group corresponding to the reflection-point number selected in Step S305 in the currently accumulated reflection-point information to obtain an approximate directed line-segment group. Then, the processing proceeds to Step S307.

Figure 12:
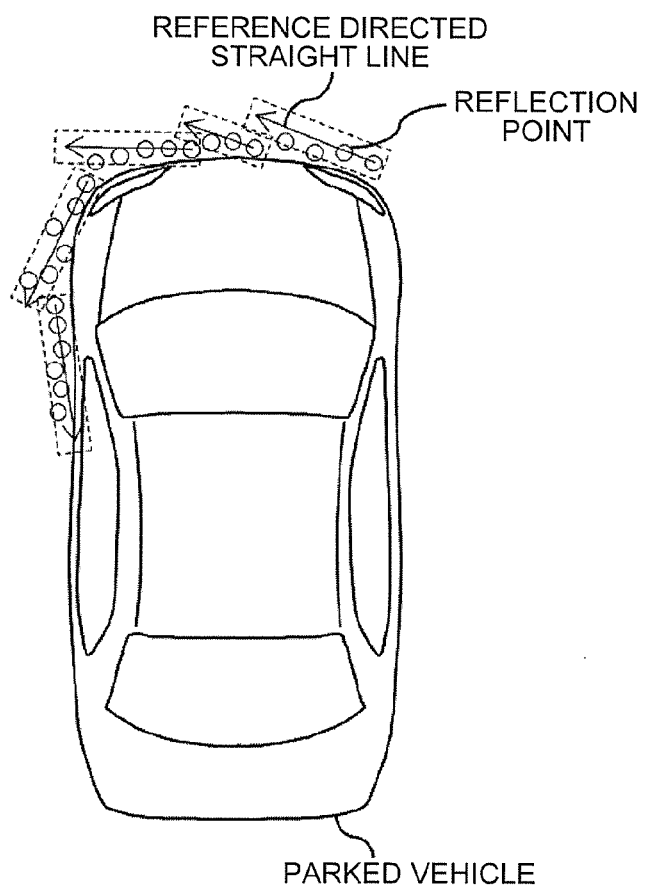
FIG. 12 is an explanatory diagram for illustrating a concept of directed line-segment approximation in the parking-space correction processing performed by the parking-space estimating unit according to the second embodiment of the present invention.
Figure 13:
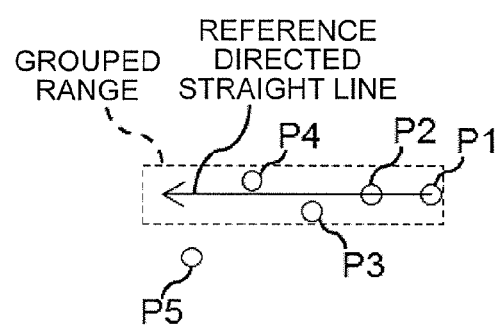
FIG. 13 is an explanatory graph for showing the concept of the directed line-segment approximation in the parking-space correction processing performed by the parking-space estimating unit according to the second embodiment of the present invention.
Figure 14:
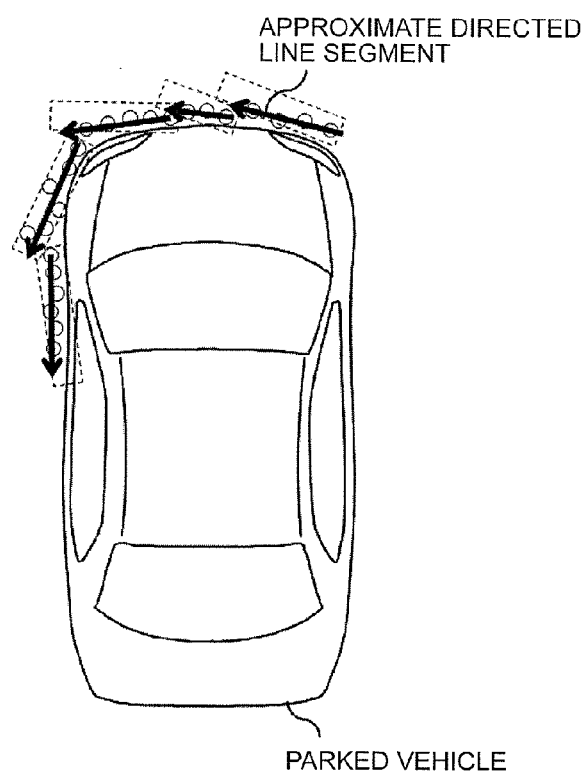
FIG. 14 is an explanatory diagram for illustrating the concept of the directed line-segment approximation in the parking-space correction processing performed by the parking-space estimating unit according to the second embodiment of the present invention.

Here, the directed line-segment approximation of the reflection-point group divides the reflection-point group into a plurality of partial groups and approximates each of the partial groups by a directed line segment. A concept of the directed line-segment approximation of the reflection-point group described above is described referring to FIG. 12, FIG. 13, and FIG. 14. FIG. 12, FIG. 13, and FIG. 14 are explanatory diagrams for illustrating the concept of the directed line-segment approximation in the parking-space correction processing performed by the parking-space estimating unit 313 according to the second embodiment of the present invention.

Here, for the description of the concept of the directed line-segment approximation of the reflection-point group, the following conditions are presumed as a specific example. Specifically, after the parking space in which perpendicular parking is possible is estimated on the right of the self-vehicle while the operation mode is the search mode, the operation mode is switched from the search mode to the guide mode. The same applies even to a case where the parking space is estimated not on the right of the self-vehicle but on the left of the self-vehicle or a case where the parking space in which the parallel parking is possible in place of the perpendicular parking is estimated.

FIG. 12 is an illustration of an example of the positions of the reflection points on the parked vehicle located on the right of the parking space, which are estimated by the reflection-point positioning unit 311 using the distance data detected by the rear-right distance sensor in a condition where the self-vehicle is guided into the parking space while moving back.

It is supposed that the reflection point moves from a front right surface of the parked vehicle located on the right of the parking space over a front left surface to a left side surface with time. In a condition where the self-vehicle leaves the parking space while moving forward by a turning function, a direction in which the reflection point moves with time is opposite to that when the self-vehicle moves back.

For example, the parking-space estimating unit 313 selects the first two reflection points and sets a straight line connecting the selected two reflection points as a reference directed straight line. In a case where reflection points P1, P2, P3, P4, and P5 are located in the stated order as illustrated in FIG. 13, a straight line connecting the reflection point P1 and the reflection point P2 is obtained as a reference directed straight line.

Subsequently, the parking-space estimating unit 313 selects the reflection points located after the reflection points forming the reference directed straight line in order and calculates a distance between the selected reflection point and the reference directed straight line. When the calculated distance is smaller than a preset distance value that is set in advance, the parking-space estimating unit 313 selects a next reflection point. On the other hand, when the calculated distance is equal to or larger than the preset distance value, the parking-space estimating unit 313 groups the reflection points from the reflection points forming the reference directed straight line to the reflection point that is located just before the currently selected reflection point.

Further, the parking-space estimating unit 313 selects the currently selected reflection point and the subsequent reflection point and sets a straight line that connects the reflection points as a new reference directed straight line so as to group the subsequent reflection points. The grouping processing described above is repeated until all the reflection points are grouped.

Specifically, as illustrated in FIG. 13, the parking-space estimating unit 313 selects the reflection point P3 subsequent to the reflection points P1 and P2 that form the reference directed straight line so as to calculate the distance between the reflection point P3 and the reference directed straight line. The calculated distance is smaller than the preset distance value, and hence the parking-space estimating unit 313 selects the reflection point P4 subsequent to the reflection point P3.

The parking-space estimating unit 313 similarly calculates a distance between the selected reflection point P4 and the reference directed straight line. The calculated distance is smaller than the preset distance value, and hence the parking-space estimating unit 313 selects the reflection point P5 subsequent to the reflection point P4.

The parking-space estimating unit 313 calculates a distance between the selected reflection point P5 and the reference directed straight line. The calculated distance is equal to or larger than the preset distance value, and hence the parking-space estimating unit 313 groups the reflection points from the reflection points P1 and P2 forming the reference directed straight line to the reference point P4 that is located just before the currently selected reference point P5. Therefore, in FIG. 13, the reflection points P1, P2, P3, and P4 are included in a grouped range.

As described above, in FIG. 13, the reflection points present inside a frame indicated by a broken line, which has the reference directed straight line connecting the reflection points P1 and P2 as a center, are targets to be grouped. Specifically, besides the reflection points P1 and P2, the reflection points P3 and P4 are also targets to be grouped.

On the other hand, the reflection point P5 is not to be grouped and is used as one of the reflection points forming a new reference directed straight line. In this case, the parking-space estimating unit 313 selects the currently selected reflection point P5 and a subsequent reflection point and sets a straight line connecting the reflection points as a new reference directed straight line. Then, the parking-space estimating unit 313 repeats the same grouping processing until all the reflection points are grouped.

Subsequently, the parking-space estimating unit 313 linearly approximates the reflection points included in each of the groups formed as described above to obtain the approximate straight line.

Further, the parking-space estimating unit 313 obtains an approximate directed line segment having a foot of a perpendicular drawn from the first reflection point of each of the groups as a starting point and a foot of a perpendicular drawn from the last reflection point of the group as an end point for each of the groups, for the approximate straight line corresponding to each of the groups.

FIG. 14 is an illustration of the approximate directed line segments obtained by the processing described above performed by the parking-space estimating unit 313 for the positions of the plurality of reflection points on the parked vehicle, which are exemplified in FIG. 12. Specifically, in FIG. 14, an approximate directed line-segment group composed of a plurality of the approximate directed line segments each obtained from the positions of the reflection points included in each of the groups obtained in FIG. 12.

As described above, FIG. 12 and FIG. 14 are illustrations of the condition where the parking space in which the perpendicular parking is possible is estimated on the right of the self-vehicle and the self-vehicle is guided into the parking space while moving back. Therefore, as illustrated in FIG. 14, a direction of the approximate directed line segments obtained by the parking-space estimating unit 313 is a direction oriented from the front right surface of the parked vehicle located on the right of the parking space over the front left surface toward the left side surface.

Referring back to FIG. 11, in Step S307, the parking-space estimating unit 313 divides the approximate directed line-segment group obtained from the reflection-point group corresponding to the reflection-point number selected in Step S305 into two subgroups. Then, the processing proceeds to Step S308.

Figure 15:
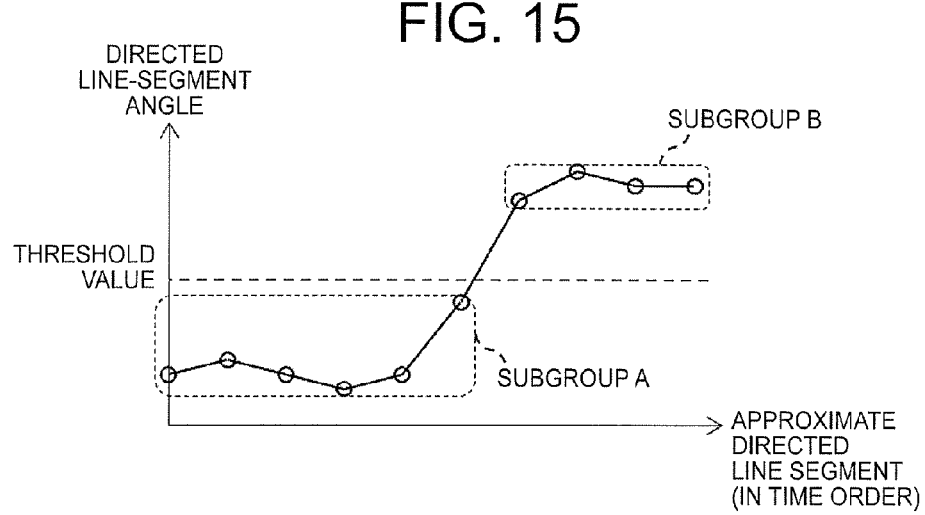
FIG. 15 is an explanatory graph for showing a concept of division of an approximate directed line-segment group in the parking-space correction processing performed by the parking-space estimating unit according to the second embodiment of the present invention.
Figure 16:
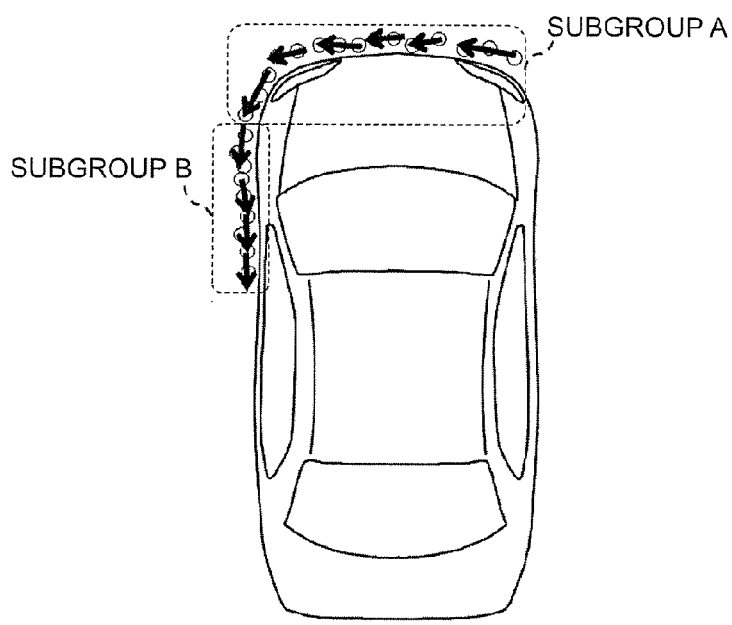
FIG. 16 is an explanatory diagram for illustrating the concept of the division of the approximate directed line-segment group in the parking-space correction processing performed by the parking-space estimating unit according to the second embodiment of the present invention.
Figure 17:
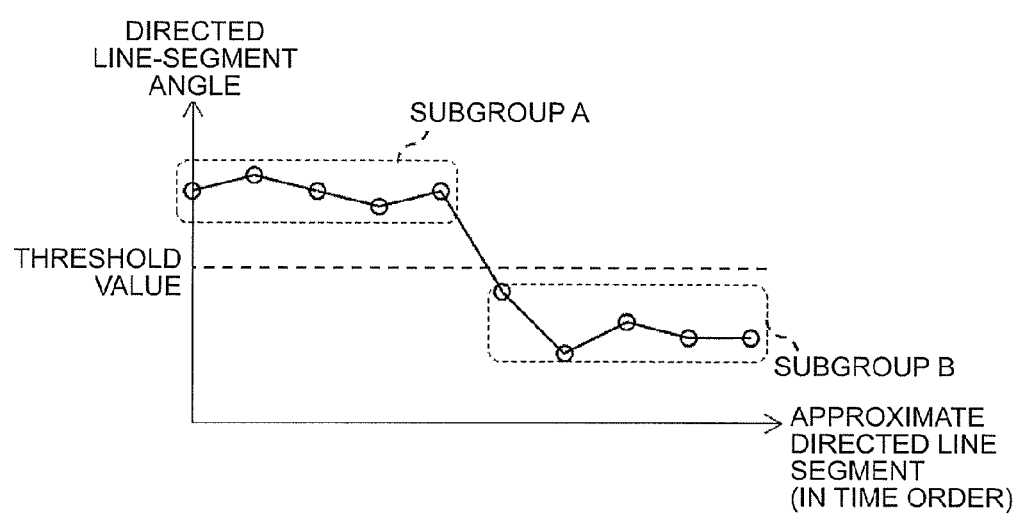
FIG. 17 is an explanatory graph for showing the concept of the division of the approximate directed line-segment group in the parking-space correction processing performed by the parking-space estimating unit according to the second embodiment of the present invention.

Here, a concept of the division of the approximate directed line-segment group is described referring to FIG. 15, FIG. 16, FIG. 17, and FIG. 18. FIG. 15, FIG. 16, FIG. 17, and FIG. 18 are explanatory graphs and diagrams for illustrating the concept of the division of the approximate directed line-segment group in the parking-space correction processing performed by the parking-space estimating unit 313 according to the second embodiment of the present invention. In FIG. 15 and FIG. 17, one reference line serving as a reference is defined. An angle formed by each of the directed line segments relative to the reference line is defined as a directed line-segment angle.

The parking-space estimating unit 313 divides the approximate directed line-segment group based on a feature value of the approximate directed line-segment group. Specifically, the approximate directed line-segment group is divided based on a change in direction of the approximate directed line-segment group, specifically, a change in angle of the approximate directed line-segment group.

For example, in a case where the parking space in which the perpendicular parking is possible is estimated on the right of the self-vehicle and the self-vehicle is guided into the parking space while moving back, the change in angle of each of the approximate directed line segments included in the approximate directed line-segment group obtained by the reflection-point group on the parked vehicle located on the right of the parking space is considered. In this case, as shown in FIG. 15 and illustrated in FIG. 16, in each of the approximate directed line segments, the directed line-segment angle becomes an approximately constant value over the front right surface and the front left surface of the parked vehicle, increases in the vicinity of the corner on the front left surface, and then becomes an approximately constant value again on the left side surface of the parked vehicle.

Figure 18:
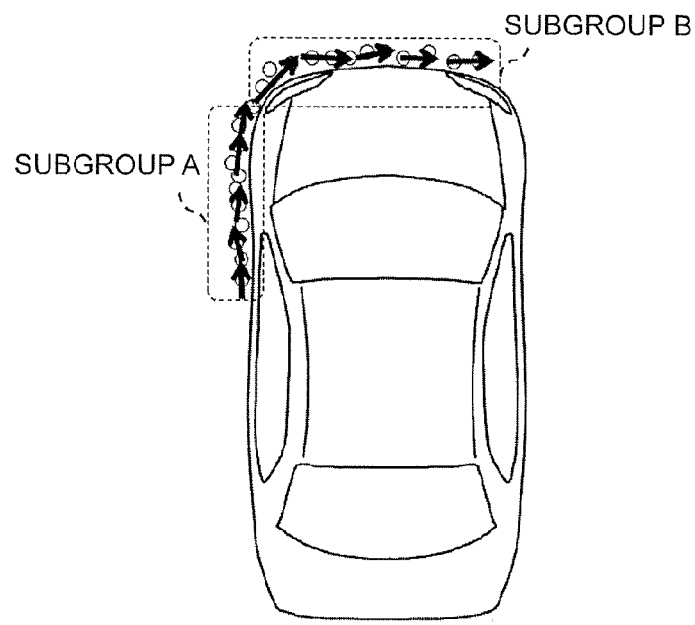
FIG. 18 is an explanatory diagram for illustrating the concept of the division of the approximate directed line-segment group in the parking-space correction processing performed by the parking-space estimating unit according to the second embodiment of the present invention.

On the other hand, when the self-vehicle leaves the parking space while moving forward, as shown in FIG. 17 and illustrated in FIG. 18, in each of the approximate directed line segments, the directed line-segment angle becomes an approximately constant value over the left side surface of the parked vehicle, decreases in the vicinity of the corner on the front left surface, and then becomes an approximately constant value again over the front left surface and the front right surface of the parked vehicle. Even in a case where the parking space is estimated on the left of the self-vehicle (not shown), the angle changes in a similar manner.

For example, the parking-space estimating unit 313 uses an arithmetic mean of a maximum value and a minimum value of the angles of the approximate directed line segments included in the approximate directed line-segment group as a threshold value so as to divide the approximate directed line-segment group into the approximate directed line segments having the angle equal to or larger than the threshold value and the approximate directed line segments having the angle smaller than the threshold value.

Specifically, as shown in FIG. 15, the parking-space estimating unit 313 divides the approximate directed line-segment group into the approximate directed line segment having the angle smaller than the threshold value as a subgroup A and the approximate directed line segment having the angle equal to or larger than the threshold value as a subgroup B. For a data set contained in each of the subgroups A and B, a data piece having a value of the directed line-segment angle, which is greatly different from those of peripheral data pieces, may be eliminated from the subgroups. In this case, the data piece having the value of the directed line-segment angle, which is greatly different from those of the peripheral data pieces, is specified as being derived from both the side surface and the front surface of the object. Further, the data piece specified as being derived from both the side surface and the front surface of the object is, for example, not required to be used to correct the parking-space information at all or may be determined as being obtained from the positions of the reflection point derived from the corner of the object to be used to correct the parking-space information.

Referring back to FIG. 11, in Step S308, the parking-space estimating unit 313 compares a difference between the angles of the subgroups obtained by dividing the approximate directed line-segment group into two in Step S307 and a preset angle value θ1 that is set in advance with each other. When the difference in angle is larger than the preset angle value θ1, the processing performed by the parking-space estimating unit 313 proceeds to Step S309. If not, the processing proceeds to Step S310.

Here, the difference in angle between the subgroups obtained by dividing the approximate directed line-segment group into two is regarded as a statistic difference determined from the angles of the subgroups obtained by dividing the approximate directed line-segment group into two. As the statistic, for example, an average value or a median of the angles of the approximate directed line segments included in the approximate directed line-segment group is used. However, the angle of the approximate directed line segment located in the vicinity of the corner has an intermediate value between the angle of the approximate directed line segment corresponding to the front surface of the parked vehicle and the angle of the approximate directed line segment corresponding to the side surface of the parked vehicle, and therefore is an outlier for the angle of the front surface and the angle of the side surface. Therefore, it is preferred to use a statistic that is robust to the outlier, for example, the median.

In Step S309, the parking-space estimating unit 313 compares the difference in angle between the subgroups obtained by dividing the approximate directed line-segment group into two in Step S307 and a preset angle value θ2 that is set in advance. The preset angle value θ2 is set so as to be larger than the preset angle value θ1. When the difference in angle is larger than the preset angle value θ2, the processing performed by the parking-space estimating unit 313 proceeds to Step S312. If not, the processing proceeds to Step S311.

In Step S310, the parking-space estimating unit 313 linearly approximates all the reflection points included in the reflection-point group corresponding to the reflection-point number selected in Step S305 to obtain the approximate straight line. Then, the processing proceeds to Step S313.

When the difference in angle between the subgroups obtained by dividing the approximate directed line-segment group into two in Step S307 is equal to or smaller than the preset angle value θ1 in Step S308, the reflection-point group does not include the reflection point corresponding to the corner portion of the parked vehicle and therefore can be regarded as being composed only of the reflection points corresponding to the front surface or the side surface. Therefore, the parking-space estimating unit 313 performs the processing of the contents in Step S310.

In Step S311, the parking-space estimating unit 313 obtains a sum of the line-segment lengths of the approximate directed line segments for each of the subgroups obtained by dividing the approximate directed line-segment group into two in Step S307. The line-segment length of the approximate directed line segment is a distance between a starting point and an end point of the approximate directed line segment.

Subsequently, in Step S311, the parking-space estimating unit 313 linearly approximates all the reflection points included in the subgroup having a larger calculated sum of the line-segment lengths so as to obtain the approximate straight line. Then, the processing proceeds to Step S313.

When the difference in angle between the subgroups obtained by dividing the approximate directed line-segment group into two in Step S307 is larger than the preset angle value θ1 and is equal to or smaller than the preset angle value θ2, the reflection-point group can be regarded as being almost entirely composed of the reflection points corresponding to the front surface or the side surface although the reflection-point group includes the reflection points corresponding to the corner portion of the parked vehicle. A contour length of the front surface or the side surface is larger than that of the corner portion. Therefore, the approximate directed line segment having the larger sum of the line-segment lengths can be regarded as corresponding to the front surface or the side surface. Therefore, the parking-space estimating unit 313 performs the processing of the contents in Step S311.

In Step S312, the parking-space estimating unit 313 linearly approximates the reflection points respectively corresponding to the subgroups obtained by dividing the approximate directed line-segment group into two in Step S307 to obtain two approximate straight lines. Then, the processing proceeds to Step S313.

When the difference in angle between the subgroups obtained by dividing the approximate directed line-segment group into two in Step S307 is larger than the preset angle value θ2, the reflection-point group includes the reflection points corresponding to the corner portion of the parked vehicle. Thus, each of the subgroups of the approximate directed line-segment group can be regarded as corresponding to any one of the front surface and the side surface. Therefore, the parking-space estimating unit 313 performs processing of the contents in Step S312.

Next, in Step S313, the parking-space estimating unit 313 determines whether or not the approximate straight line obtained in the previous step is valid.

For the determination of validity of the approximate straight line, which is performed by the parking-space estimating unit 313 in Step S313, a method similar to that of the first embodiment described above may be used as a determination method. Specifically, when the distance between the corresponding corner A or B and the approximate straight line is smaller than the preset distance value as illustrated in FIG. 9 and the line-segment length of the approximate straight line is larger than the preset line-segment value as illustrated in FIG. 10, the parking-space estimating unit 313 determines that the approximate straight line is valid.

When the parking-space estimating unit 313 determines that the approximate straight line is valid in Step S313, the processing proceeds to Step S314. On the other hand, when the parking-space estimating unit 313 determines that the approximate straight line is invalid in Step S313, the processing proceeds to Step S315.

In Step S314, the parking-space estimating unit 313 adopts the approximate straight line that is determined as being valid in Step S313 and determines which of the front-surface portion and the side-surface portion of the parked vehicle the approximate straight line is derived from based on a positional relationship of the adopted approximate straight line with respect to the parked vehicle. Then, the processing proceeds to Step S316.

Specifically, for example, a case where the parking space in which the perpendicular parking is possible is estimated on the right of the self-vehicle and the self-vehicle is guided into the parking space while moving back is considered. In this case, as illustrated in FIG. 16, the parking-space estimating unit 313 classifies the approximate straight line obtained from the reflection points included in the subgroup A having the smaller angle as a front-surface portion approximate straight line derived from the front-surface portion. On the other hand, the parking-space estimating unit 313 classifies the approximate straight line obtained from the reflection points included in the subgroup B having the larger angle as a side-surface portion approximate straight line derived from the side-surface portion.

In Step S315, the parking-space estimating unit 313 rejects the approximate straight line determined as invalid in Step S313. Then, the processing proceeds to Step S316.

In Step S316, the parking-space estimating unit 313 determines whether or not there is any reflection-point number that is not selected yet. When there is a reflection-point number that is not selected yet, the processing returns to Step S305 so that the parking-space estimating unit 313 performs the processing after Step S305 again. On the other hand, when there is no reflection-point number that is not selected yet, the processing performed by the parking-space estimating unit 313 proceeds to Step S317.

In Step S317, the parking-space estimating unit 313 determines whether or not there is an approximate straight line adopted in Step S314. When there is an approximate straight line adopted in Step S314, the processing performed by the parking-space estimating unit 313 proceeds to Step S318. If not, the processing is terminated.

In Step S318, when the approximate straight line is classified as the front-surface portion approximate straight line in Step S314, the parking-space estimating unit 313 outputs the front-surface portion approximate straight line as vehicle front-surface information. Then, the processing proceeds to Step S319. When the approximate straight line is classified as the side-surface portion approximate straight line in Step S314, the parking-space estimating unit 313 outputs the side-surface portion approximate straight line as the vehicle side-surface information. Then, the processing proceeds to Step S319.

Here, when a plurality of the front-surface portion approximate straight lines or the side-surface portion approximate straight lines for different reflection-point numbers are adopted, for example, an approximate straight line obtained by linearly approximating all the reflection points forming the approximate straight lines again for each of the front-surface portion and the side-surface portion is output. Alternatively, for example, among the approximate straight lines, the approximate straight line having the largest line-segment length is output for each of the front-surface portion and the side-surface portion.

In Step S319, the parking-space estimating unit 313 determines whether or not both the front-surface portion approximate straight line adopted in Step S314 and the side-surface portion approximate straight line adopted in Step S314 are obtained. When both the front-surface portion approximate straight line and the side-surface portion approximate straight line are obtained, the processing performed by the parking-space estimating unit 313 proceeds to Step S320.

On the other hand, when the front-surface portion approximate straight line and the side-surface portion approximate straight line are not both obtained, the processing performed by the parking-space estimating unit 313 is terminated. In this manner, the parking-space estimating unit 313 can use the vehicle front-surface information or the vehicle side-surface information output in Step S318 to correct the parking space.

Specifically, when the vehicle front-surface information is output, the parking-space estimating unit 313 can obtain the front-surface shape and the front-surface position of the parked vehicle, which correspond to the front-surface portion approximate straight line, based on the front-surface portion approximate straight line contained in the vehicle front-surface information. Therefore, the parking space is corrected based on the front-surface portion approximate straight line. Similarly, when the vehicle side-surface information is output, the parking-space estimating unit 313 can obtain the side-surface shape and the side-surface position of the parked vehicle corresponding to the side-surface portion approximate straight line based on the side-surface portion approximate straight line contained in the vehicle side-surface information. Therefore, the parking space is corrected based on the side-surface portion approximate straight line. The vehicle control unit 320 continues the parking assistance in accordance with the corrected parking space.

In Step S320, the parking-space estimating unit 313 calculates an intersection between the front-surface portion approximate straight line adopted in Step S314 and the side-surface portion approximate straight line adopted in Step S314 and additionally estimates the calculated intersection as a corner position. Then, the processing is terminated.

Figure 19:
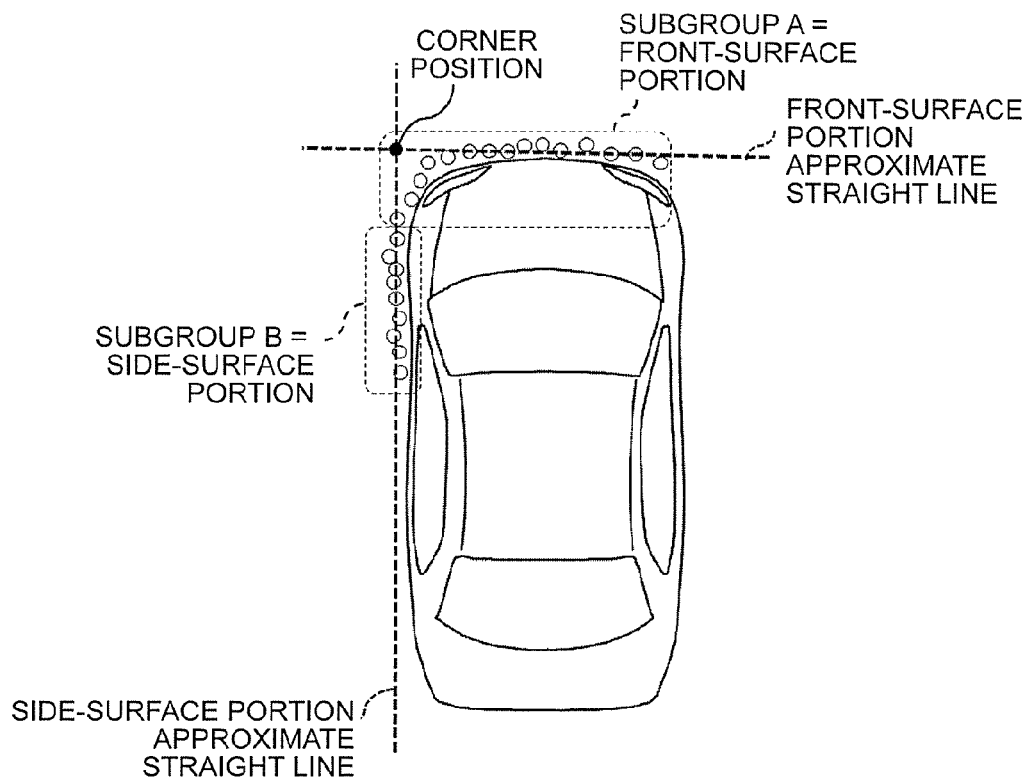
FIG. 19 is an explanatory diagram for illustrating a concept of estimation of a corner position from an intersection of approximate straight lines in the parking-space correction processing performed by the parking-space estimating unit according to the second embodiment of the present invention.

Here, a concept of estimation of the corner position from the intersection between the front-surface portion approximate straight line and the side-surface portion approximate straight line is described referring to FIG. 19. FIG. 19 is an explanatory diagram for illustrating the concept of estimation of the corner position from the intersection of the approximate straight lines in the parking-space correction processing performed by the parking-space estimating unit 313 according to the second embodiment of the present invention.

As illustrated in FIG. 19, the parking-space estimating unit 313 estimates, as the corner position of the parked vehicle, the intersection between the front-surface portion approximate straight line obtained from the reflection points corresponding to the front-surface portion of the parked vehicle, that is, the reflection points included in the subgroup A, and the side-surface portion approximate straight line obtained from the reflection points corresponding to the side-surface portion of the parked vehicle, that is, the reflection points included in the subgroup B.

By performing the processing in Step S320, the parking-space estimating unit 313 can correct the parking space by using the vehicle front-surface information and the vehicle side-surface information output in Step S318 and the additionally estimated corner position.

Specifically, as illustrated in FIG. 19, the parking-space estimating unit 313 corrects the parking space based on the front-surface portion approximate straight line contained in the vehicle front-surface information, the side-surface portion approximate straight line contained in the vehicle side-surface information, and the additionally estimated corner position. The vehicle control unit 320 continues the parking assistance in accordance with the corrected parking space.

As described above, when the operation mode is the guide mode, the parking-space estimating unit 313 accumulates, as the reflection-point group, the positions of the reflection points estimated in time series by the reflection-point positioning unit 311 after the operation mode is switched from the search mode to the guide mode and uses the accumulated reflection-point group to correct the parking space.

As described above, according to the second embodiment, when the operation mode is the guide mode, the parking-space estimating unit accumulates, as the reflection-point group, the positions of the reflection points estimated in time series by the reflection-point positioning unit after the operation mode is switched from the search mode to the guide mode. The parking-space estimating unit repeats the grouping processing of grouping the reflection points, at each of which the distance from the reference directed straight line connecting the two reflection points that are continuous in time series is smaller than the preset distance value, so as to divide the reflection-point group into the plurality of groups. By obtaining the approximate directed line segment for each of the groups based on the reflection points included in each of the groups, the approximate directed line-segment group is obtained.

Further, the parking-space estimating unit divides the approximate directed line-segment group into the two subgroups based on the feature value of each of the directed line-segment groups included in the obtained approximate directed line-segment group, obtains the approximate straight line from the reflection points included in each of the subgroups obtained by dividing the approximate directed line-segment group into two, classifies the obtained approximate straight line as any of the front-surface portion approximate straight line derived from the front surface of the object and the side-surface portion approximate straight line derived from the side surface of the object, and uses the thus classified approximate straight line to correct the parking-space information.

In the manner described above, even when the accuracy of estimation of the corner position of each of the objects present at the positions adjacent to the parking space is low, the parking space is sequentially corrected during the guide mode. Thus, the self-vehicle can be appropriately guided into the parking space. Further, in comparison with the first embodiment described above, the parking-space estimating unit approximates the accumulated reflection points by the directed line segments to estimate the front surface, the side surface, and the corner position of the parked vehicle. Therefore, the parking space can be corrected with higher accuracy.

What is claimed is:

1. A parking assist apparatus for performing, while moving a self-vehicle including: a distance sensor for detecting distance data to an object corresponding to a target to be detected by radiating a detection wave to the object to obtain a detection wave reflected at a reflection-point position on the object, which corresponds to a shortest distance to the object; and a vehicle information sensor for detecting, as self-vehicle data, a state relating to a velocity and a traveling direction of the self-vehicle, processing of estimating a parking space in which parking of the self-vehicle is possible when an operation mode is a search mode and performing guiding assistance processing for enabling the self-vehicle to be parked in the parking space when the operation mode is a guide mode based on results of time-series detections performed by the distance sensor and the vehicle information sensor, the parking assist apparatus comprising:
   a reflection-point positioning unit configured to estimate the reflection-point positions on the object in time series from the results of the time-series detections performed by the distance sensor and the vehicle information sensor;
   a corner detecting unit configured to estimate a corner position of the object as corner-position information by using the reflection-point positions estimated in time series by the reflection-point positioning unit;
   a parking-space estimating unit configured to estimate the parking space in which the parking of the self-vehicle is possible as parking-space information by using the corner-position information estimated by the corner detecting unit; and
   a vehicle control unit configured to provide parking assistance for enabling the self-vehicle to be parked in the parking space in accordance with the parking-space information estimated by the parking-space estimating unit, wherein:
   the parking-space estimating unit is further configured to:
      extract at least a part of the reflection-point positions estimated in time series by the reflection-point positioning unit when the operation mode is the guide mode, to thereby accumulate the extracted reflection-point positions as a reflection-point group; and
      specify the accumulated reflection-point positions included in the reflection-point group as one of a reflection-point position derived from a side surface of the object, a reflection-point position derived from a front surface of the object, and a reflection-point position derived from both the side surface and the front surface of the object, to thereby correct the parking-space information in accordance with a result of the specifying; and
   the vehicle control unit provides the parking assistance in accordance with the corrected parking-space information.

2. A parking assist apparatus according to claim 1, wherein the parking-space estimating unit is further configured to, when the operation mode is the guide mode and after a position of the distance sensor enters a parking region:
   extract at least a part of the reflection-point positions estimated in time series by the reflection-point positioning unit; and
   approximate the accumulated reflection-point positions included in the reflection-point group by a straight line to obtain an approximate straight line, to thereby correct the parking-space information by using the obtained approximate straight line.

3. A parking assist apparatus according to claim 2, wherein the parking-space estimating unit is further configured to:
   determine that the approximate straight line is valid when a distance between the approximate straight line and a parking-space boundary connecting the corner positions that are estimated by the corner detecting unit during the search mode is smaller than a preset distance value and an angle formed between the parking-space boundary and the approximate straight line is larger than a preset angle value; and correct the parking-space information by using only the approximate straight line determined as valid.

4. A parking assist apparatus according to claim 1, wherein the parking-space estimating unit is further configured to:

repeat grouping processing of grouping reflection points, at each of which a distance from a reference directed straight line connecting two reflection points continuous in time series is smaller than a preset distance value, for the accumulated reflection-point positions included in the reflection-point group to divide the reflection-point group into a plurality of groups, to thereby obtain an approximate directed straight line for each of the plurality of groups based on the reflection points included in each of the plurality of groups to obtain an approximate directed line-segment group;

divide the approximate directed line-segment group into two subgroups based on a feature value of each of directed line-segment groups included in the obtained approximate directed line-segment group, to thereby obtain an approximate straight line from the reflection points included in each of the two subgroups obtained by dividing the approximate directed line-segment group; and classify the obtained approximate straight line as any one of a front-surface portion approximate straight line derived from the front surface of the object and a side-surface portion approximate straight line derived from the side surface of the object, to thereby correct the parking-space information by using the classified approximate straight line.

5. A parking assist apparatus according to claim 4, wherein, the parking-space estimating unit is further configured to, when both the front-surface portion approximate straight line and the side-surface portion approximate straight line are obtained as a result of the classification of the approximate straight line as any one of the front-surface portion approximate straight line and the side-surface portion approximate straight line:

calculate an intersection between the front-surface portion approximate straight line and the side-surface portion approximate straight line, to thereby additionally estimate the calculated intersection as a corner position of the object; and correct the parking-space information by using the front-surface portion approximate straight line, the side-surface portion approximate straight line, and the additionally estimated corner position of the object.

* * * * *